United States Patent
Arakawa et al.

(10) Patent No.: US 8,477,230 B2
(45) Date of Patent: Jul. 2, 2013

(54) IMAGE FORMING OPTICAL SYSTEM AND ELECTRONIC IMAGE PICKUP APPARATUS USING THE SAME

(75) Inventors: Masaki Arakawa, Hachioji (JP); Keisuke Ichikawa, Tama (JP); Tetsuya Yanai, Kodaira (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 252 days.

(21) Appl. No.: 13/134,789

(22) Filed: Jun. 15, 2011

(65) Prior Publication Data
US 2011/0310286 A1 Dec. 22, 2011

(30) Foreign Application Priority Data
Jun. 17, 2010 (JP) ................. 2010-138552

(51) Int. Cl.
H04N 5/225 (2006.01)
G02B 9/58 (2006.01)
G02B 9/34 (2006.01)

(52) U.S. Cl.
USPC ................... 348/340; 359/782; 359/783

(58) Field of Classification Search
USPC ........... 348/340; 359/689, 683, 684, 781, 359/782, 783, 695, 784
See application file for complete search history.

(56) References Cited

U.S. PATENT DOCUMENTS

| | | | | |
|---|---|---|---|---|
| 6,088,172 | A * | 7/2000 | Sato | 359/770 |
| 6,710,935 | B2 * | 3/2004 | Morooka | 359/689 |
| 7,443,612 | B2 * | 10/2008 | Suzuki | 359/782 |
| 8,274,593 | B2 * | 9/2012 | Chen et al. | 348/335 |
| 2006/0262423 | A1 * | 11/2006 | Kiyotoshi | 359/689 |

FOREIGN PATENT DOCUMENTS

| | | |
|---|---|---|
| JP | 2001-021805 | 1/2001 |
| JP | 201-145117 | 5/2001 |
| JP | 2001-208964 | 8/2001 |
| JP | 2001-268583 | 9/2001 |
| JP | 2002-365545 | 12/2002 |
| JP | 2003-043354 | 2/2003 |
| JP | 2003-241091 | 8/2003 |
| JP | 2005-181392 | 7/2005 |
| JP | 2006-003544 | 1/2006 |
| JP | 2006-145823 | 6/2006 |
| JP | 2007-156385 | 6/2007 |

* cited by examiner

Primary Examiner — Aung S Moe
Assistant Examiner — Amy Hsu
(74) Attorney, Agent, or Firm — Kenyon & Kenyon LLP

(57) ABSTRACT

An image forming optical system of the present invention is characterized by comprising three groups having, in order from an object side to an image side, a first lens group having a negative refractive power, a second lens group having a positive refractive power, and a third lens group having a positive refractive power, or four groups with one more lens group added to the image side, the first lens group comprises one lens component facing its concave surface toward the object side, the second lens group comprises a single lens having a positive refractive power and a cemented lens having a negative refractive power as a whole, and the third lens group comprises a lens component having a positive refractive power, wherein upon zooming from the wide-angle end toward the telephoto side, the amount of movement of the first lens group in the optical axis direction in an area, where the focal length of the entire image pickup optical system is 3.4 times or more with respect to at the wide-angle end, satisfies the following conditional expression (1):

$$-1 \leq (G1(W) - G1(H))/fw \leq 0.5 \quad (1).$$

11 Claims, 16 Drawing Sheets

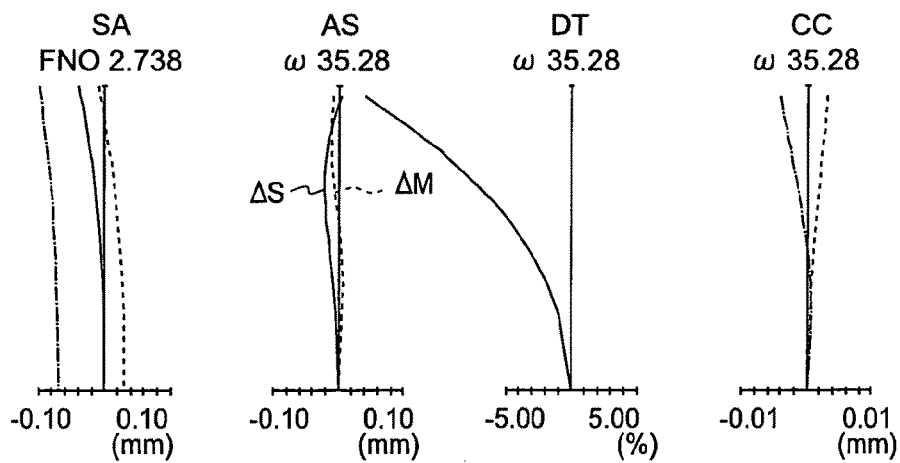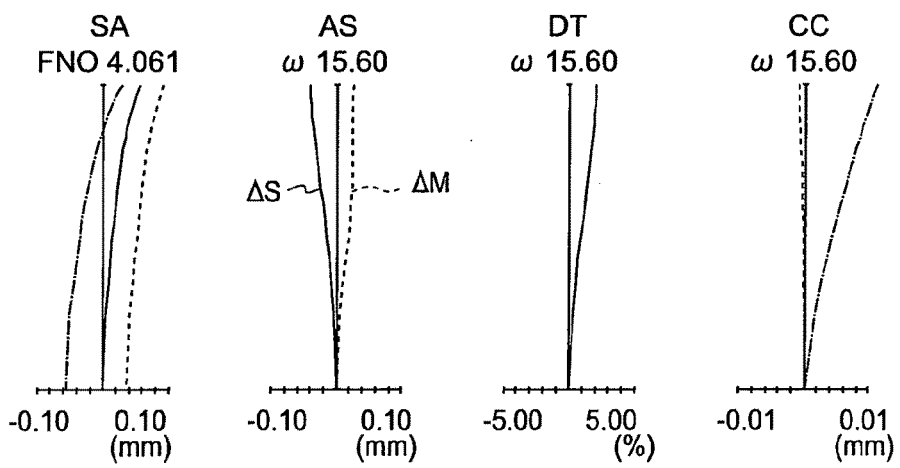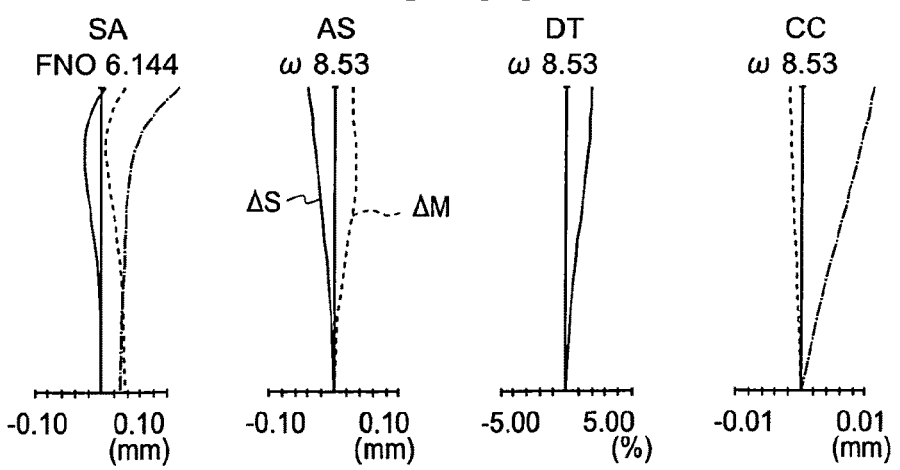

FIG. 16A
FIG. 16B
FIG. 16C
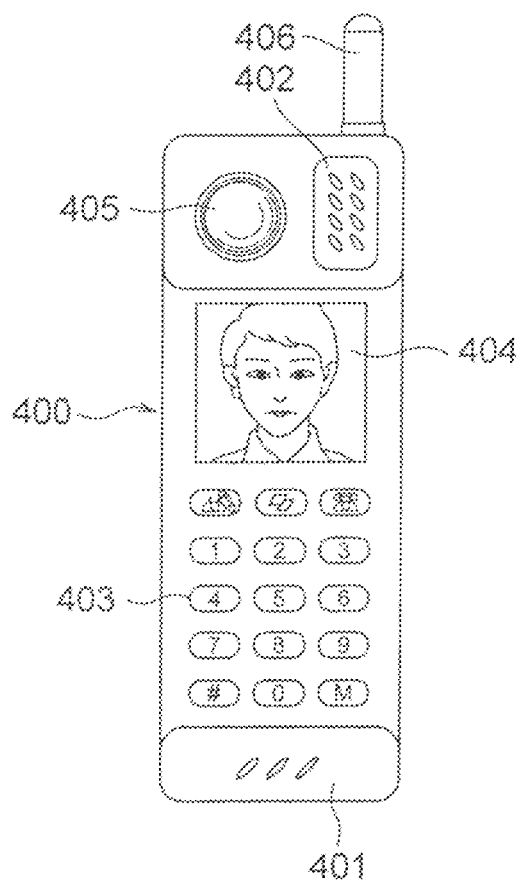
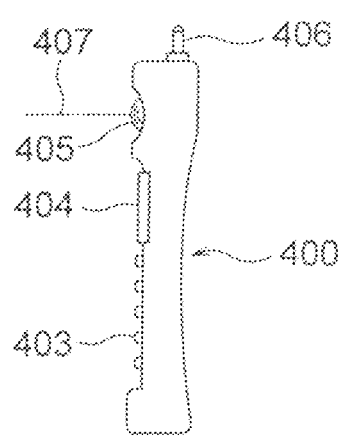
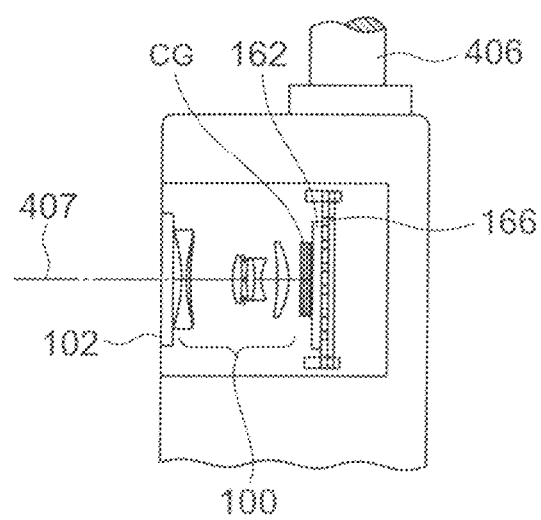

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2010-138552 filed on Jun. 17, 2010; the entire contents of which are incorporated herein by reference.

BACKGROUND OF THE INVENTION

1. Field of the Invention

The present invention relates to an image forming optical system and an electronic image pickup apparatus using the same.

2. Description of the Related Art

In recent years, digital cameras have been becoming popular as the next generation of cameras to take the place of silver-halide 35 mm-film cameras, and the digital cameras have been becoming more compact and thinner these days.

The following two measures A and B can be considered to be typical measures to make zoom lens compact and thin, namely:

A. Use of a collapsible lens barrel to house the optical system in the direction of the thickness (depth) of the body. This collapsible lens barrel is a lens barrel having such a mechanism that the optical system extends from the camera body when taking pictures and is housed into the camera body when being carried.

B. Use of a bending optical system to house the optical system in the direction of the width or height of the body. This bending optical system is an optical system having such a structure to bend the optical path (optical axis) of the optical system by a reflecting optical element such as a mirror or a prism.

For example, there is a structure described in the following Patent Literature 1 as a conventional example using the above measure A, and there is a structure described in the following Patent Literature 2 as a conventional example using the above measure B.

Correction of chromatic aberrations is an important issue to make the zoom lens compact and thin. As means to solve this issue, there are known transparent media having effective dispersion characteristics or partial dispersion characteristics the conventional glass does not have, for example, in the following Patent Literature 3, Patent Literature 4, Patent Literature 5, and Patent Literature 6.

Further, in an electronic image pickup apparatus using an electronic image pickup device, flare is likely to occur due to h-line (404.66 nm) chromatic aberrations. The following Patent Literature 7 is known as placing importance of the correction of the h-line chromatic aberrations.

In addition, there is no optical medium having desired partial dispersion characteristics that can correct chromatic aberrations near 400 nm. Therefore, there is known a structure, for example, proposed in the following Patent Literature 8, in which transmittance at 400 nm is intentionally reduced to perform image pickup, and after performing image pickup, color reproduction is adjusted using the image processing function of the image pickup apparatus.

There are known other structures, for example, proposed in the following Patent Literature 9 and Patent Literature 10, in which image processing is performed to compensate for chromatic flare that cannot be corrected by the optical system itself because of insufficient partial dispersion characteristics of the optical materials, especially on the short-wavelength side.

[Patent Literature 1] Japanese Patent Application Laid-Open No. 2002-365545
[Patent Literature 2] Japanese Patent Application Laid-Open No. 2003-43354
[Patent Literature 3] Japanese Patent Application Laid-Open No. 2005-181392
[Patent Literature 4] Japanese Patent Application Laid-Open No. 2006-145823
[Patent Literature 5] Japanese Patent Application Laid-Open No. 2003-241091
[Patent Literature 6] Japanese Patent Application Laid-Open No. 2006-003544
[Patent Literature 7] Japanese Patent Application Laid-Open No. 2001-208964
[Patent Literature 8] Japanese Patent Application Laid-Open No. 2001-021805
[Patent Literature 9] Japanese Patent Application Laid-Open No. 2001-145117
[Patent Literature 10] Japanese Patent Application Laid-Open No. 2001-268583
[Patent Literature 11] Japanese Patent Application Laid-Open No. 2007-156385

SUMMARY OF THE INVENTION

An image forming optical system of the present invention comprises three groups having, in order from an object side to an image side, a first lens group having a negative refractive power, a second lens group having a positive refractive power, and a third lens group having a positive refractive power, or four groups with one more lens group added to the image side, the first lens group comprises one lens component facing its concave surface toward the object side, the second lens group comprises a single lens having a positive refractive power and a lens component having a negative refractive power as a whole, and the third lens group comprises a lens component having a positive refractive power, wherein upon zooming from a wide-angle end toward a telephoto side, the amount of movement of the first lens group along the optical axis direction in an area, where the focal length of the entire image pickup optical system is 3.4 times or more with respect to at the wide-angle end, satisfies the following conditional expression (1):

$$-1 \leq (G1(W) - G1(H))/fw \leq 0.5 \tag{1}$$

where $G1(W)$ is distance from an image plane at the wide-angle end of the image forming optical system to a surface of the first lens group on the most image plane side, and $G1(H)$ is distance from the image plane to the surface of the first lens group on the most image plane side in the area, where the focal length of the image forming optical system is 3.4 times or more with respect to at the wide-angle end.

An electronic image pickup apparatus of the present invention comprises the above-mentioned image forming optical system, an electronic image pickup device, and image processing means for processing image data obtained by picking up, on the electronic image pickup device, an image formed through the image forming optical system and outputting it as image data with the image shape changed, wherein the image forming optical system is a zoom lens, and the image forming optical system satisfies the following conditional expression when focusing on an object point at infinity:

$$0.700 < y07/(fw \times \tan \omega 07w) < 0.975 \tag{B}$$

where y07 is expressed as y07=0.7×y10 when distance (maximum image height) from the center to the farthest point within an effective image pickup plane (within a plane capable of picking up the image) of the electronic image pickup device is denoted as y10, and ω07w is an angle with respect to the optical axis in the direction of the object point corresponding to an image point formed at position y07 from the center on the image pickup plane at the wide-angle end, and fw is a focal length of the entire image forming optical system at the wide-angle end.

BRIEF DESCRIPTION OF THE DRAWING

FIG. 1A is a state at the wide-angle end, FIG. 1B is an intermediate state, and FIG. 1C is a state at the telephoto end.

FIG. 2A is a state at the wide-angle end, FIG. 2B is an intermediate state, and FIG. 2C is a state at the telephoto end.

FIG. 3A is a state at the wide-angle end, FIG. 3B is an intermediate state, and FIG. 3C is a state at the telephoto end.

FIG. 4A is a state at the wide-angle end, FIG. 4B is an intermediate state, and FIG. 4C is a state at the telephoto end.

FIG. 5A is a state at the wide-angle end, FIG. 5B is an intermediate state, and FIG. 5C is a state at the telephoto end.

FIGS. 6A, 6B, and 6C are diagrams showing spherical aberration, astigmatism, distortion, and chromatic aberration of magnification when the zoom lens according to Example 3 achieves focus on the object point at infinity, where FIG. 6A is a state at the wide-angle end, FIG. 6B is an intermediate state, and FIG. 6C is a state at the telephoto end.

FIG. 7A is a state at the wide-angle end, FIG. 7B is an intermediate state, and FIG. 7C is a state at the telephoto end.

FIG. 8A is a state at the wide-angle end, FIG. 8B is an intermediate state, and FIG. 8C is a state at the telephoto end.

FIGS. 16A, 16B, and 16C are views showing a cellular phone as an example of an information processing apparatus in which an image forming optical system of the present invention is incorporated as a photographing optical system, where FIG. 16A is a front view of a cellular phone 400, FIG. 16B is a side view, and FIG. 16C is a sectional view of a photographing optical system 405.

DETAILED DESCRIPTION OF THE INVENTION

Figure 1A:
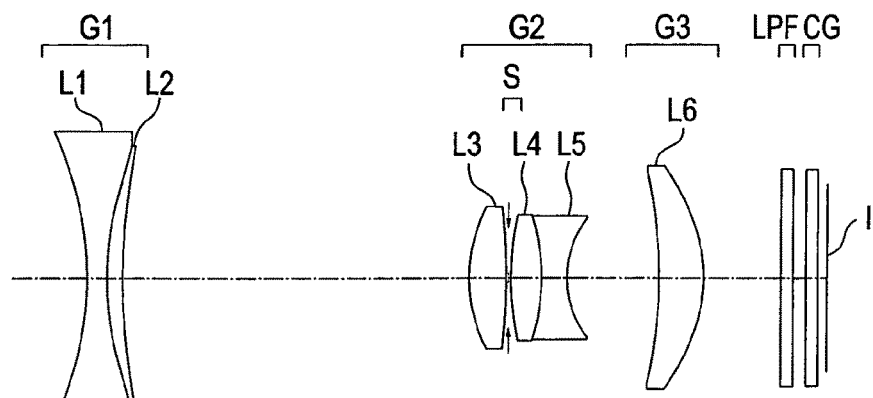
FIGS. 1A, 1B, and 1C are sectional views taken along the optical axis to show the optical structure of a zoom lens according to Example 1 of the present invention when focusing on an object point at infinity, where

Before describing examples, the operation and effects of an image forming optical system of a preferred embodiment will be described.

The image forming optical system of the embodiment is characterized by comprising, in order from an object side to an image side, three groups having a first lens group having a negative refractive power, a second lens group having a positive refractive power, and a third lens group having a positive refractive power, or four groups with one more lens group added to the image side, the first lens group comprises one lens component facing its concave surface toward the object side, the second lens group comprises a single lens having a positive refractive power and a cemented lens having a negative refractive power as a whole, and the third lens group comprises a lens component having a positive refractive power, wherein upon zooming from a wide-angle end toward a telephoto side, the amount of movement of the first lens group along the optical axis direction in an area, where the focal length of the entire system is 3.4 times or more with respect to at the wide-angle end, satisfies the following conditional expression (1):

$$-1 \leq (G1(W) - G1(H))/fw \leq 0.5 \tag{1}$$

where

G1(W) is distance from an image plane to the surface of the first lens group on the most image plane side at the wide-angle end of the image forming optical system, and G1(H) is distance from the image plane to the surface of the first lens group on the most image plane side in the area, where the focal length is 3.4 times or more with respect to at the wide-angle end of the image forming optical system.

Thus, the optical system of the present invention comprises the three groups having, in order from the object side to the image side, the first lens group having a negative refractive power, the second lens group having a positive refractive power, and the third lens group having a positive refractive power, or the four groups with one more lens group added to the image side, the first lens group comprises the one lens component facing its concave surface toward the object side, the second lens group comprises the single lens having a positive refractive power and the cemented lens having a negative refractive power as a whole, and the third lens group comprises the lens component having a positive refractive power, wherein upon zooming from the wide-angle end toward the telephoto side, the amount of movement of the first lens group in the optical axis direction in the area, where the focal length of the entire system is 3.4 times or more with respect to at the wide-angle end, satisfies the conditional expression (1).

Since the first lens group comprises one lens component alone, the thickness of the first lens group can be made thinner, and hence the collapsing thickness and the entire length of the optical system can be reduced. In other words, since one group comprises one component, the entire length of the optical system can be reduced.

Further, the concave surface faces toward the image side in the first lens group, so that the principal point of the first lens group can be moved to the image side. This can reduce the distance to the front-side principal point of the second lens group, and hence is effective in correcting various aberrations, especially for coma, in the second lens group and beyond.

In other words, this makes it easier to make corrections in combination with the second lens group in the setting of the concave surface in one group.

Further, the second lens group has a positive-negative structure so that the principal point can extend toward the first lens group side, enabling reduction in the distance in principal point to the first lens group.

Further, since the cemented lens is included in the second lens group, chromatic aberrations caused when the refractive power of the single lens having a positive refractive power is increased can be corrected within the second lens group.

Longitudinal chromatic aberration caused when the entire length of the optical system is reduced can also be corrected.

In other words, it can be said that this structure is simple and high in aberration correction capabilities.

In addition, since the third lens group is a lens component having a positive refractive power, the thickness of the third lens group can be made thinner, and hence the collapsing thickness and the entire length of the optical system can be reduced. If the structure of the second lens group is maintained, aberrations can be corrected adequately even when the third lens group comprises a lens component having a positive refractive power, thereby contributing to downsizing.

When such a structure is satisfied, even if the entire length at wide-angle end is set as long as the entire length at the position where the focal length at the wide-angle end is 3.4 times, to downsize the optical system, good performance can be obtained as a whole. Specifically, such an effect can be obtained by satisfying the conditional expression (1). If the conditional expression (1) is not satisfied, the effect of this lens cannot be obtained, or the performance cannot be obtained with this lens.

If the upper limit of conditional expression (1) is exceeded, the lateral magnification of the second lens group and beyond is small. Therefore, the entire lens length at the wide-angle end becomes long, and this is not suitable for downsizing of the optical system.

If the lower limit of conditional expression (1) is exceeded, the refractive power of the first lens group is large or the lateral magnification of the second lens group and the beyond is large. Therefore, the entire length of the lens becomes long at the telephoto end, and this is not suitable for downsizing of the optical system. Further, since the refractive power of the first lens group is large, a beam of light with a wide angle of view, especially at the wide-angle end, produces coma significantly.

Thus, when the above structure is satisfied, the entire optical length can be made shorter in a high variable magnification area of 3.4 or more, which is difficult to achieve in the conventional techniques, and the amount of movement of the first lens group from the wide-angle end to the telephoto end can also be made smaller, so that a thin camera with excellent optical performance can be obtained.

It is also desired that the first lens group be a cemented lens consisting of a lens An having a negative refractive power and a lens Ap having a positive refractive power, with the cementing surface being a spherical surface and the image side surface of the first lens group being an aspheric surface, and conditional expression (2) is satisfied.

$$1 \leq \phi R\_G1(Y)/\phi R\_G1 \leq 2 \qquad (2),$$

where $\phi R\_G1(Y)$ is the refractive power of a surface of the first lens group on the most image plane side at distance Y from the optical axis, $\phi R\_G1$ is the refractive power of a surface of the first lens group on the most image plane side, and the range of Y is an image height on the image plane to show the following relation:

image height×0.8 ≤ Y ≤ image height at image plane.

Figure 9:
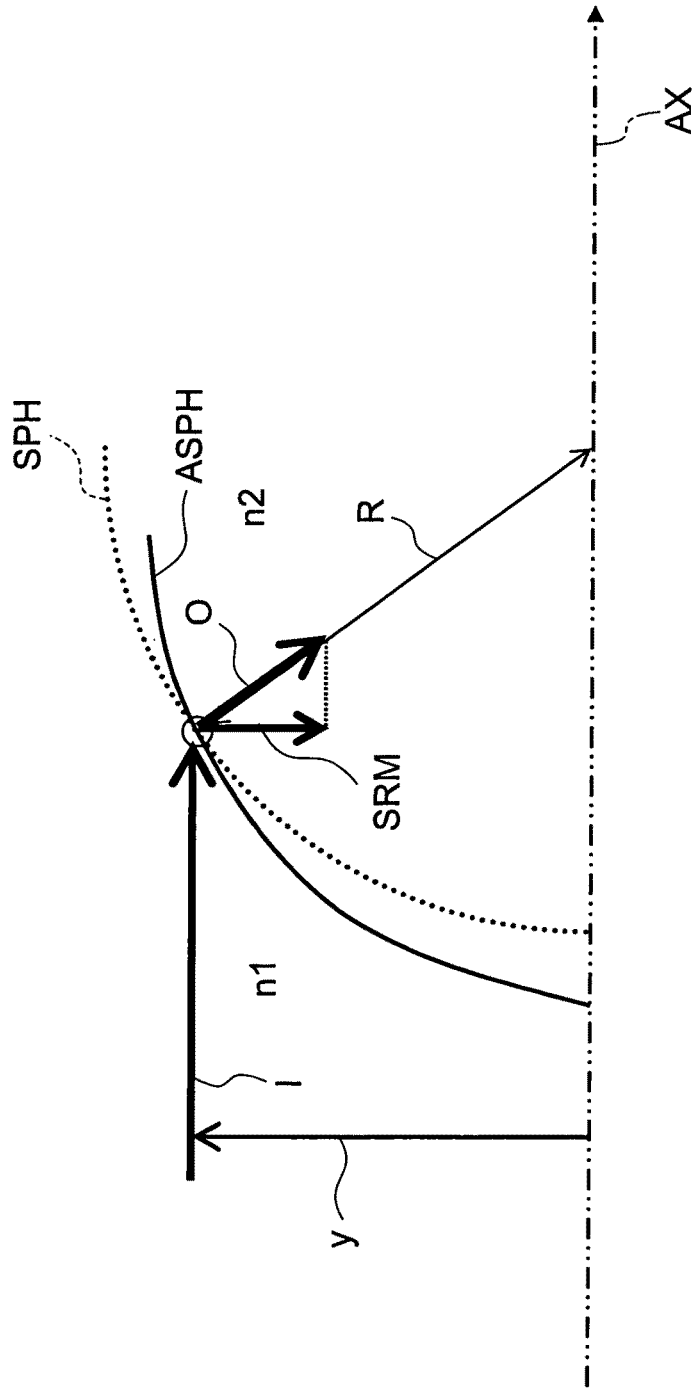
FIG. 9 is a graph for describing the refractive power of surface.

Here, the definition of "Refractive Power of Surface" will be described. FIG. 9 is used to describe the "Refractive Power of Surface." The refractive power of a local surface is defined as follows (see Principles of Optics I, p. 217):

Refractive Power $\phi = (n2-n1)/R$, where n1 is the refractive index of an incidence side medium,
n2 is the refractive index of an exit side medium, and
R is the radius of curvature of a refracting surface.

In the case of an aspheric surface, the reduced radius of curvature, R, is derived as follows:

$$R = y/SRM,$$

y is distance from the optical axis of an incident beam, and
SRM is the magnitude of a direction cosine of the incident beam.

In FIG. 9, incident beam I is incident on a refracting surface (aspheric surface indicated by the solid line in the figure) from optical axis AX to a position of height y in parallel to the optical axis AX. As a result of the ray tracing, the magnitude of incident beam O=1.

The direction cosine SRM of the incident beam O is 0 ≤ Magnitude ≤ 1. Further, the relation of magnitude is SRM: O=y:R. In FIG. 9, the reduced spherical surface is indicated by the broken line.

Here, because of a characteristic related to the spherical cementing surface, this is applicable only to Example 2 and Example 4 to be described later.

The optical system of the present invention is characterized in that the first lens group comprises the cemented lens consisting of the lens An having a negative refractive power and the lens Ap having a positive refractive power, with the cementing surface being a spherical surface and the image side surface of the first lens group being an aspheric surface, and conditional expression (3) is satisfied.

Since the cementing surface is a spherical surface, the occurrence of high-order chromatic aberrations can be suppressed.

If the upper limit of the conditional expression (2) is exceeded, excessive correction is made for coma of incident light flux with a wide angle of view at the wide-angle end, resulting in degrading image formation performance.

Correction of curvature of field also becomes excessive, and this tends to produce aberrations containing high-order terms and to make astigmatic differences large.

If the lower limit of the conditional expression (2) is exceeded, since correction for coma of incident light flux with a wide angle of view at the wide-angle end and correction for astigmatic differences become insufficient, sufficient image formation performance cannot be obtained.

The satisfaction of the conditional expression (2) can lead to obtaining an image forming optical system in which various aberrations are corrected even with a high variable magnification though the cementing surface is a spherical surface.

Thus, when the above structure is satisfied, the entire optical length can be made shorter in a high variable magnification area of 3.4 or more, which is difficult to achieve in the conventional techniques, so that a thin camera with excellent optical performance can be obtained.

It is also characterized in that, in the cemented lens consisting of the lens An having a negative refractive power and the lens Ap having a positive refractive power in the first lens group, the cementing surface is an aspheric surface and the image side surface of the first lens group is an aspheric surface, and the following conditional expression (3) is satisfied:

$$-1 \leq \{\phi L\_G1(Y) + \phi R\_G1(Y)\} \times fw \leq 0 \quad (3)$$

where $\phi L\_G1(Y)$ is the refractive power of a surface of the first lens group on the most object side when the height of a beam of light is Y, $\phi R\_G1(Y)$ is the refractive power of a surface of the first lens group on the most image plane side when the height of the beam of light is Y, and fw is the focal length of the entire image forming optical system at the wide-angle end.

Since this characteristic is available when the cementing surface is an aspheric surface, this is applicable only to Example 1 and Example 3 to be described later.

It is preferred that the image forming optical system of the present invention be such that, in the cemented lens consisting of the lens An having a negative refractive power and the lens Ap having a positive refractive power in the first lens group, the cementing surface is an aspheric surface and the image side surface of the first lens group is an aspheric surface, and the conditional expression (3) is satisfied.

Since the cementing surface is an aspheric surface, this structure has an advantage in correcting chromatic aberrations. Particularly, this is effective in correcting chromatic aberrations of magnification caused upon a high variable magnification.

Further, since the image side surface of the first lens group is an aspheric surface, monochromatic aberrations (coma, astigmatic difference) collaterally produced when the cementing surface is mainly used for color correction can be corrected, enabling improvement in image formation performance.

If the upper limit of the conditional expression (3) is exceeded, high order coma, curvature of field, and astigmatic differences occur, and hence the image formation performance is degraded.

Further, when the amount of aspheric surface is large, decentration sensitivity is increased, and this often brings manufacturing drawbacks.

If the lower limit of the conditional expression (3) is exceeded, correction for various aberrations becomes insufficient, so that sufficient image formation performance cannot be obtained.

The satisfaction of the conditional expression (3) can lead to obtaining an image forming optical system in which various aberrations are corrected even with a high variable magnification while correcting chromatic aberrations on the cementing surface.

Thus, when the above structure is satisfied, the entire optical length can be made shorter in a high variable magnification area of 3.4 or more, which is difficult to achieve in the conventional techniques, so that a thin camera with excellent optical performance can be obtained.

Further, it is characterized in that the lens component having a positive refractive power located on the most object side in the second lens group satisfies the following conditional expression (4), where the radius of curvature of the object side surface is expressed as R_G2L and the radius of curvature of the image side surface is expressed as R_G2R:

$$-1 \leq (R\_G2L + R\_G2R)/(R\_G2L - R\_G2R) \leq -0.01 \quad (4).$$

The optical system of the present invention is characterized in that the lens component having a positive refractive power located on the most object side in the second lens group satisfies the conditional expression (4), where the radius of curvature of the object side surface is expressed as R_G2L and the radius of curvature of the image side surface is expressed as R_G2R.

When the upper limit to the conditional expression (4) is exceeded, the power of the second lens group is reduced, and this brings disadvantages in reducing the entire length.

If the lower limit of the conditional expression (4) is exceeded, this brings disadvantages in correcting spherical aberrations and coma. Especially, this makes it difficult to correct off-axis ambient beams.

If the conditional expression (4) is satisfied, a shape is assumed, which can vary the degree of magnification without changing almost all the angles of incidence of the ambient beams. Therefore, a structure advantageous in using variable magnifications to correct spherical aberrations, coma, and astigmatic differences can be obtained.

Thus, if the conditional expression (4) is satisfied, it is easy to reduce the entire length while making spherical aberrations and coma adequate.

Further, it is characterized in that the second lens group satisfies the following conditional expression (5), where the total central thickness of the second lens group is expressed as D_G2, and the thickness of a lens component having a negative refractive power on the most image side of the negative cemented lens in the second lens group is expressed as D_G2N:

$$0.14 \leq D\_G2N/D\_G2 \leq 0.5 \quad (5).$$

It is preferred that the optical system of the present invention should have the second lens group satisfy the conditional expression (5), where the total central thickness of the second lens group is expressed as D_G2, and the thickness of a lens component having a negative refractive power on the most image side of the negative cemented lens in the second lens group is expressed as D_G2N.

The single lens having a positive refractive power in the second lens group tends to have large positive refractive power because the second lens group is responsible for varying the degree of magnification in its entirety. Thus, the negative cemented lens can correct the produced chromatic aberrations longitudinal (axial) chromatic aberration, chromatic coma aberration) in its entirety to improve the image formation performance.

In addition, a certain degree of thickness is required for the negative cemented lens to correct the chromatic aberrations.

If the upper limit of the conditional expression (5) is exceeded, the thickness of the negative cemented lens is made thick, and hence excessive correction is made for the aberrations.

When the thickness is too thick, the distance in principal point to the single lens having a positive refractive power becomes large. This leads to the significant occurrence of longitudinal aberrations and coma in the second lens group through which thick light flux passes.

Further, since the thickness of the second lens group is increased, the optical system is unfavorable for downsizing.

In addition, since it is difficult to ensure the edge thickness of the single lens having a positive refractive power (object-side positive lens), the F-number tends to be dark.

If the lower limit of the conditional expression (5) is exceeded, it is disadvantageous to correct chromatic aberrations.

Thus, if the conditional expression (5) is satisfied, the chromatic aberrations can be corrected sufficiently while ensuring the edge thickness of the object-side positive lens.

In addition, in the second lens group through which thick light flux passes, since the lenses can be disposed properly with a distance in principal point between the lenses close to each other, the aberration correction capabilities can be dramatically improved.

Further, the third lens group is a focusing lens and satisfies the following conditional expression (6), where in regard to a shape of the most image side surface, the paraxial radius of curvature is expressed as SPH_G3R(Y), the aspheric surface shape is expressed as ASP_G3R(Y), and the image height on the image plane is expressed as FIM:

$$0.05 \leq \{ASP\_G3R(Y) - SPH\_G3R(Y)\}/fw \leq 0.5 \qquad (6),$$

where the aspheric surface shape is defined by the following expression:

$$ASP(Y) = \frac{\frac{1}{R}Y^2}{1 + \sqrt{1 - (1+k)\left(\frac{Y}{R}\right)^2}} + BY^4 + CY^6 + DY^8 + EY^{10} + \ldots$$

where
Y is a height from the optical axis,
R is a paraxial radius of curvature,
k is a conical coefficient, and
B, C, D, and E are constants.

If the upper limit of the conditional expression (6) is exceeded, coma and a meridional image plane, especially upon focusing, are likely to vary and be deteriorated.

If the lower limit of the conditional expression (6) is exceeded, it is disadvantageous to correct the meridional image plane and distortion in any focus state.

Thus, when the conditional expression (6) is satisfied and the third lens group is used as a focusing lens, aberrations, especially off-axis aberrations, can be corrected properly across the focus range.

Further, it is characterized in that the third lens group is a focusing lens and satisfies the following conditional expression (7), where distance from the most image side surface in the third lens group to the image plane at the wide-angle end is expressed as D_G3-I, and the image height is expressed as FIM:

$$3 \leq D\_G3-I/FIM \leq 5 \qquad (7)$$

It is preferred that the optical system of the present invention should satisfy the conditional expression (7), where the distance from the most image side surface in the third lens group to the image plane is expressed as D_G3-I and the image height is expressed as FIM.

If the upper limit of the conditional expression (7) is exceeded, since the distance between the third lens group and the image plane becomes large, the optical system is unfavorable for making it more compact and thinner.

Further, the distance in principal point to the second lens group becomes short at the wide-angle end to increase the effect of variable power along with the movement of the third lens group. Therefore, assuming that the third lens group is used for focusing, fluctuations of various aberrations become large for a object located at infinity or a nearby object, and this makes correction difficult.

If the lower limit of the conditional expression (7) is exceeded, the amount of movement along with focusing becomes large upon focusing the third lens group. Therefore, the size of the lens barrel is increased.

In the range of the conditional expression (7), especially assuming that the third lens group is used for focusing, various aberrations can be corrected while ensuring proper focus sensitivity and amount of movement.

Thus, when the above structure is satisfied, the entire optical length can be reduced, so that a thin camera with excellent optical performance can be obtained.

Further, if the distance from the image side surface of the second lens group to the object side surface of the third lens group at the wide-angle end is expressed as $\Delta W\_2-3$, and the distance from the image side surface of the third lens group to the image plane at the telephoto end is expressed as $\Delta T\_3-I$, it is characterized in that the following conditional expression (8) is satisfied:

$$0.5 \leq \Delta W\_2-3/\Delta T\_3-I \leq 1 \qquad (8)$$

It is preferred that the optical system of the present invention be an image forming optical system that satisfies the conditional expression (8), where the distance from the image side surface of the second lens group to the object side surface of the third lens group at the wide-angle end is expressed as $\Delta W\_2-3$ and the distance from the image side surface of the third lens group to the image plane at the telephoto end is expressed as $\Delta T\_3-I$.

If the upper limit of the conditional expression (8) is exceeded, it is inadequate because, when an electronic light-receiving element (CCD or the like) is used, the angle of incidence of off-axis light on the element becomes large. If it is ensured by force, the entire optical length is likely to be long.

If the lower limit of the conditional expression (8) is exceeded, a sufficient amount of movement cannot be ensured when the third lens group is used as the focusing lens. If it is ensured by force, the power of the third lens group needs increasing, and this is likely to increase fluctuations of aberrations, especially those by focusing.

Thus, if the conditional expression (8) is satisfied, the entire optical length can be reduced, so that a thin camera easy to focus can be obtained.

It is characterized in that the first lens group is composed by cementing two lenses, and when a lens whose paraxial focal length is a positive value is set as a positive lens, the positive lens in the first lens group is expressed as LA, and when a lens whose paraxial focal length is a negative value is set as a negative lens, a lens LB with which the lens LA is cemented is the negative lens, and the Abbe constants of the lens materials are expressed as νLB and νLA, respectively, and the following condition is satisfied:

$$0.01 \leq |1/\nu LB - 1/\nu LA| \leq 0.06 \quad (9)$$

where

νLB is Abbe constant (ndA−1)/(nFA−nCA) of the positive lens LA,

νLA is Abbe constant (ndB−1)/(nFB−nCB) of the negative lens LB, $nd_A$, $nC_A$, and $nF_A$ are refractive indexes of the refractive optical element LA for d-line, C-line, and F-line, respectively, and $nd_B$, $nC_B$, and $nF_B$ are refractive indexes of the refractive optical element LB, for d-line, C-line, and F-line, respectively.

It is preferred that the optical system of the present invention should have the first lens group composed by cementing two lenses, and when a lens whose paraxial focal length is a positive value is set as a positive lens, the positive lens in the first lens group is expressed as LA, and when a lens whose paraxial focal length is a negative value is set as a negative lens, a lens LB with which the lens LA is cemented is the negative lens, and the Abbe constants of the lens materials are expressed as νLB and νLA, respectively, and the conditional expression (9) be satisfied.

If the upper limit of the conditional expression (9) is exceeded, it is advantageous in correcting chromatic aberrations but difficult to get the materials.

If the lower limit of the conditional expression (9) is exceeded, it is difficult to correct chromatic aberrations across the entire variable magnification area (especially on the telephoto side).

Thus, if the conditional expression (9) is satisfied, chromatic aberrations can be corrected properly across the entire variable magnification area even with a high zoom ratio of 3.4 or more.

It is also characterized in that, when the refractive indexes of the lens materials for lens LA and lens LB are expressed as nLA and nLB, respectively, the following condition is satisfied:

$$0 \leq |1/nLB - 1/nLA| \leq 0.55 \quad (10)$$

It is preferred that the optical system of the present invention should satisfy the conditional expression (10), where the refractive indexes of the lens materials for lens LA and lens LB are expressed as nLA and nLB, respectively.

If the upper limit of the conditional expression (10) is exceeded, it is difficult to correct high-order chromatic aberrations of magnification and chromatic coma aberrations (if an aspheric surface is used for the cementing surface).

On the other hand, there is no case where the lower limit of the conditional expression (10) is exceeded.

Thus, if the conditional expression (10) is satisfied, coma and the like on the wide-angle side can be corrected properly without negatively affecting the high-order chromatic aberrations.

Further, it is preferred that the other lens (lens LB is assumed) with which lens LA is cemented be a negative lens and the following condition be satisfied:

$$-0.40 \leq \theta gF(LA) - \theta gF(LB) \leq -0.05 \quad (A)$$

where

θgF(LA) is partial dispersion ratio $(ng_A - nC_A)/(nF_A - nC_A)$ of lens LA,

θgF(LB) is partial dispersion ratio $(ng_B - nC_B)/(nF_B - nC_B)$ of lens LB to be cemented with, $nd_A$, $nC_A$, $nF_A$, and $ng_A$ are refractive indexes of the refractive optical element LA for d-line, C-line, F-line, and g-line, respectively, and $nd_B$, $nC_B$, $nF_B$, and $ng_B$ are refractive indexes of the refractive optical element LB for d-line, C-line, F-line, and g-line, respectively.

Further, it is preferred that the image forming optical system be a zoom lens and relative distance between respective lens groups on the optical axis should be changed upon varying the degree of magnification.

An electronic image pickup apparatus of the present invention comprises any of the above-mentioned image forming optical systems of the present invention, an electronic image pickup device, and image processing means for processing image data obtained by picking up, on the electronic image pickup device, an image formed through the image forming optical system and outputting it as image data with the image shape changed, wherein the image forming optical system is a zoom lens and the image forming optical system satisfies the following conditional expression when focusing on an object point at infinity:

$$0.700 < y07/(fw \times \tan \omega 07w) < 0.975 \quad (B)$$

Here, y07 is expressed as $y07 = 0.7 \times y10$ when distance (maximum image height) from the center to the farthest point within an effective image pickup plane (within a plane capable of picking up the image) of the electronic image pickup device is expressed as y10, and ω07w is an angle with respect to the optical axis in the direction of the object point corresponding to an image point formed at position y07 from the center on the image pickup plane at the wide-angle end, and fw is the focal length of the entire image forming optical system at the wide-angle end.

The above-mentioned image forming optical system can make the entire length of the optical system and the collapsing thickness thin without making the chromatic aberrations and the like worse. Therefore, use of such an image forming optical system in an electronic image pickup apparatus can lead to providing a thin electronic image pickup apparatus capable of obtaining high-quality images.

EXAMPLES

Examples of the image forming optical system and the electronic image pickup apparatus according to the present invention will be described in detail below with reference to the accompanying drawings. Note that the examples are not intended to limit the invention.

The schematic structure of each example will be described.

Example 1 is of a structure of three groups of negative, positive, and positive refractive power, and has a cemented lens of positive and negative refractive power in the second lens group.

Example 2 is of a structure of three groups of negative, positive, and positive refractive power, and has a cemented lens of negative and negative refractive power in the second lens group.

Example 3 is of a structure of four groups of negative, positive, positive, and positive refractive power, and has a cemented lens of positive and negative refractive power in the second lens group.

Example 4 is of a structure of four groups of negative, positive, positive, and positive refractive power, and has a cemented lens of negative and negative refractive power in the second lens group.

Figure 1B:
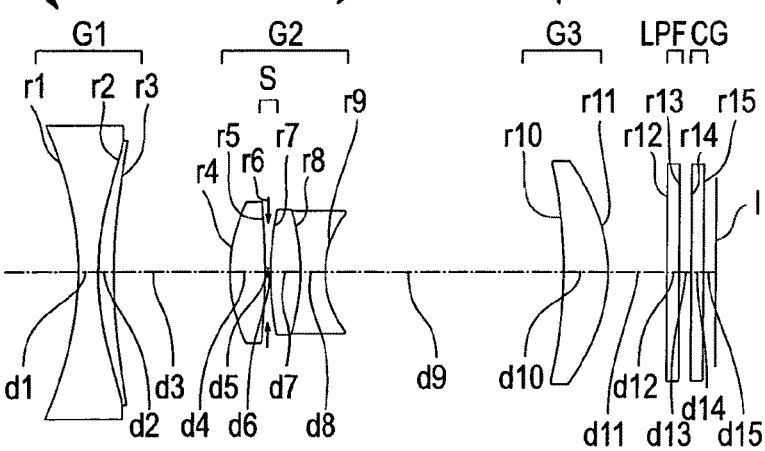
Figure 1C:
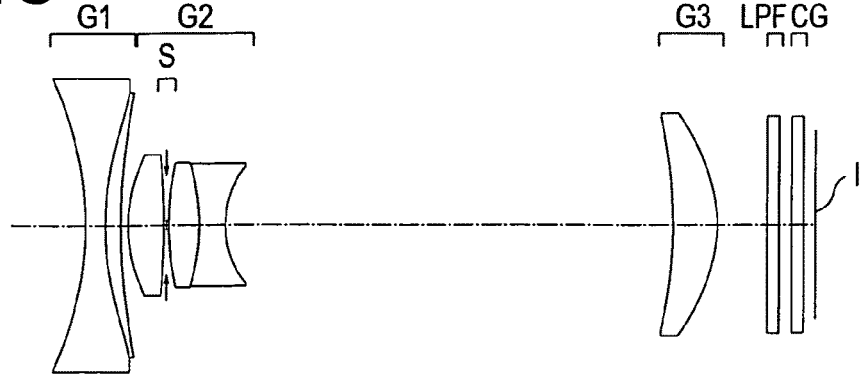

Next, a zoom lens according to Example 1 of the present invention will be described. FIGS. 1A, 1B, and 1C are sectional views taken along the optical axis to show the optical structure of the zoom lens according to Example 1 of the present invention when focusing on an object point at infinity. FIG. 1A is a state at the wide-angle end, FIG. 1B is a state of intermediate focal length, and FIG. 1C is a state at the telephoto end.

Figure 2A:
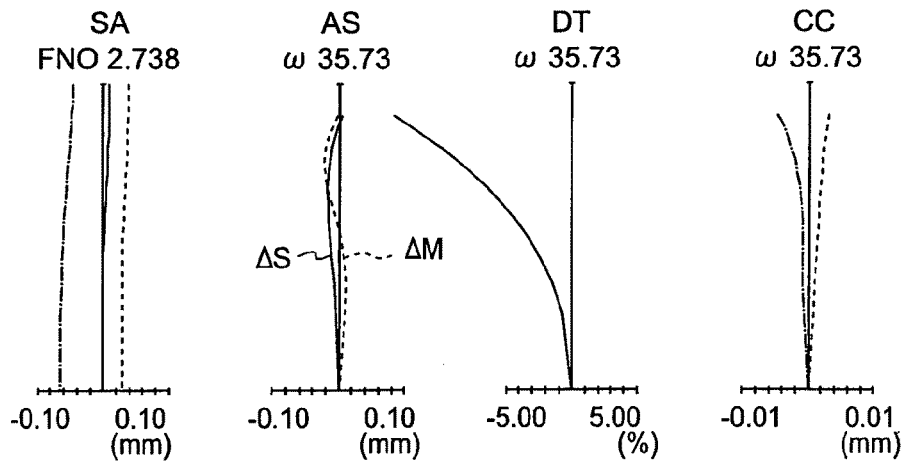
FIGS. 2A, 2B, and 2C are diagrams showing spherical aberration, astigmatism, distortion, and chromatic aberration of magnification when the zoom lens according to Example 1 achieves focus on the object point at infinity, where
Figure 2B:
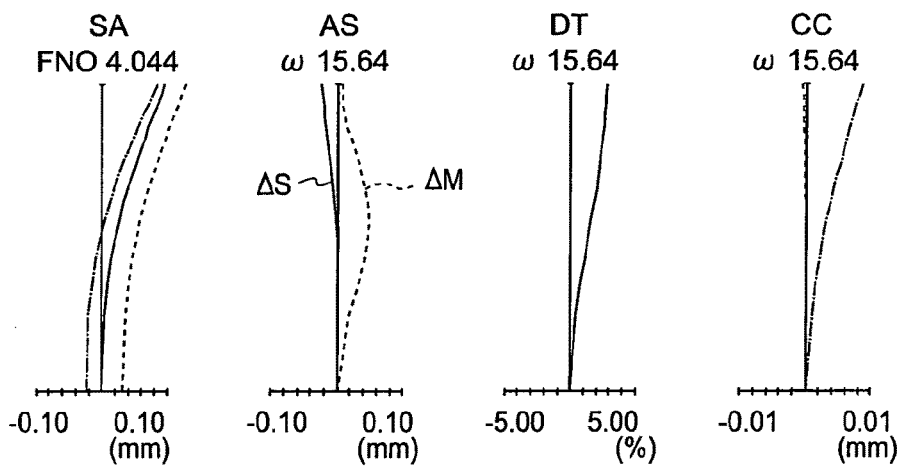
Figure 2C:
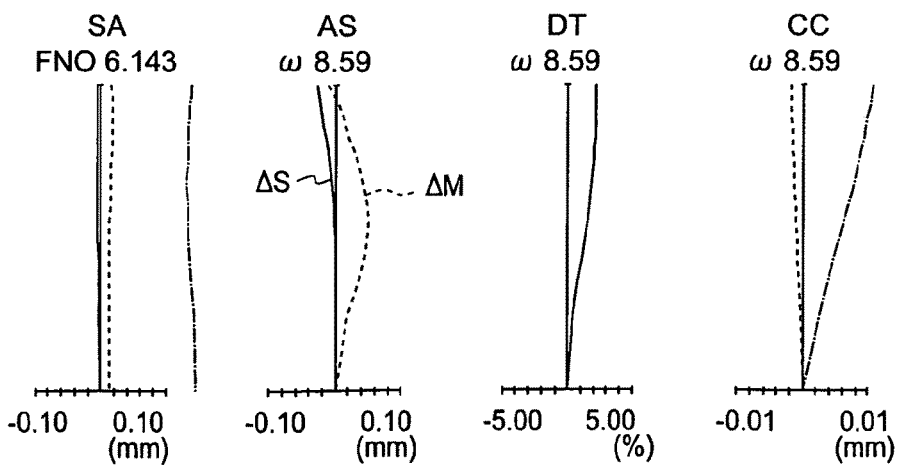

FIGS. 2A, 2B, and 2C are diagrams showing spherical aberration (SA), astigmatism (AS), distortion (DT), chromatic aberration of magnification (CC) when the zoom lens according to Example 1 achieves focus on the object point at infinity. FIG. 2A is a state at the wide-angle end, FIG. 2B is a state of intermediate focal length, and FIG. 2C is a state at the telephoto end. Note that FIY is image height, and symbols in the aberration diagrams are commonly used in the other examples to be described later.

As shown in FIGS. 1A, 1B, and 1C, the zoom lens of Example 1 includes, in order from the object side, a first lens group G1, a second lens group G2 having an aperture stop S, and a third lens group G3. Note that, in all the examples to be described later, LPF is a low-pass filter, CG is a cover glass, I is the image pickup plane of an electronic image pickup device in the sectional views of the lenses.

The first lens group G1 comprises a cemented lens with a biconcave negative lenses L1 and a positive meniscus lens L2 facing its convex surface toward the object side, having a negative refractive power as a whole.

The second lens group G2 comprises a biconvex positive lens L3 and a cemented lens with a biconvex positive lens L4 and a biconcave negative lens L5, having a positive refractive power as a whole.

The third lens group G3 comprises a positive meniscus lens L6 facing its convex surface toward the image plane side, having a positive refractive power as a whole.

Upon varying the degree of magnification from the wide-angle end to the telephoto end, the first lens group G1 moves toward the image plane side and turns around to move toward the object side, the second lens group G2 moves toward the object side, and the third lens group G3 moves toward the image plane side.

Aspheric surfaces are provided on six sides, namely: both sides of the biconcave negative lens L1 in the first lens group G1, one side of the positive meniscus lens L2 facing toward the image plane side, both sides of the biconvex positive lens L3 on the object side in the second lens group G2, and one side of the positive meniscus lens L6 on the image plane side in the third lens group G3.

Figure 3A:
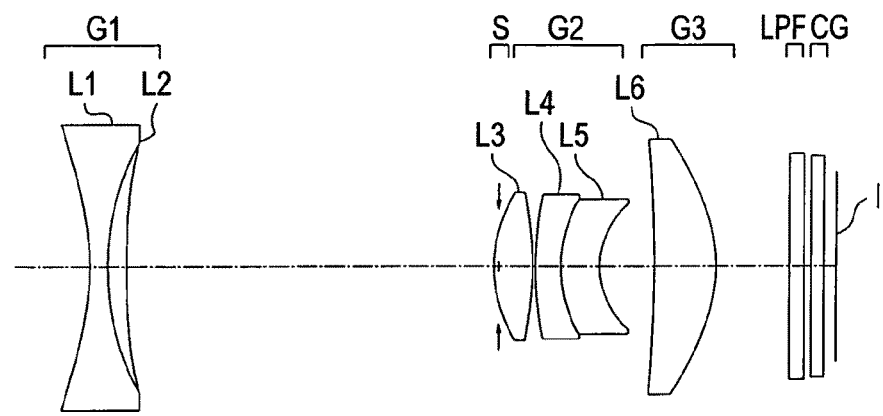
FIGS. 3A, 3B, and 3C are sectional views taken along the optical axis to show the optical structure of a zoom lens according to Example 2 of the present invention when focusing on an object point at infinity, where
Figure 3B:
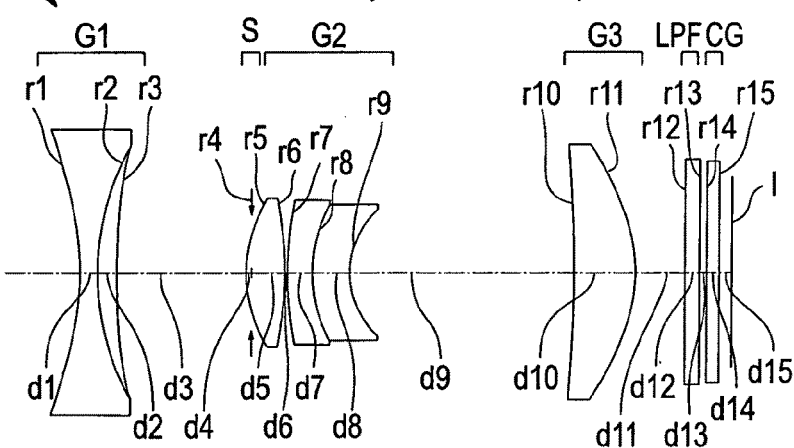
Figure 3C:
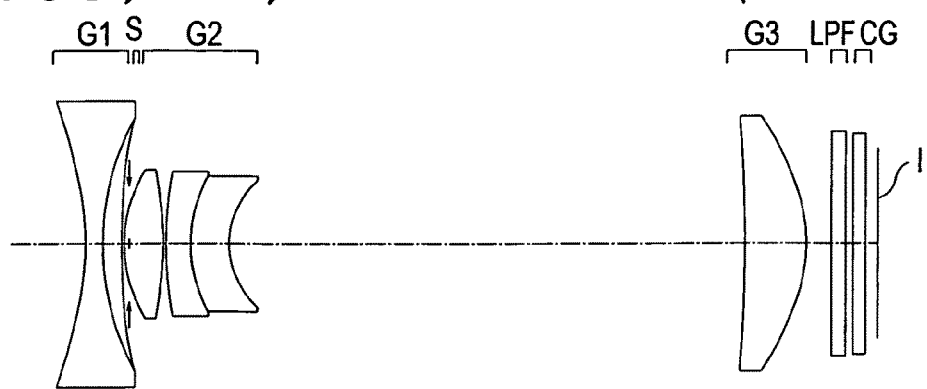

Next, a zoom lens according to Example 2 of the present invention will be described. FIGS. 3A, 3B, and 3C are sectional views taken along the optical axis to show the optical structure of the zoom lens according to Example 2 of the present invention when focusing on an object point at infinity. FIG. 3A is a state at the wide-angle end, FIG. 3B is a state of intermediate focal length, and FIG. 3C is a state at the telephoto end.

Figure 4A:
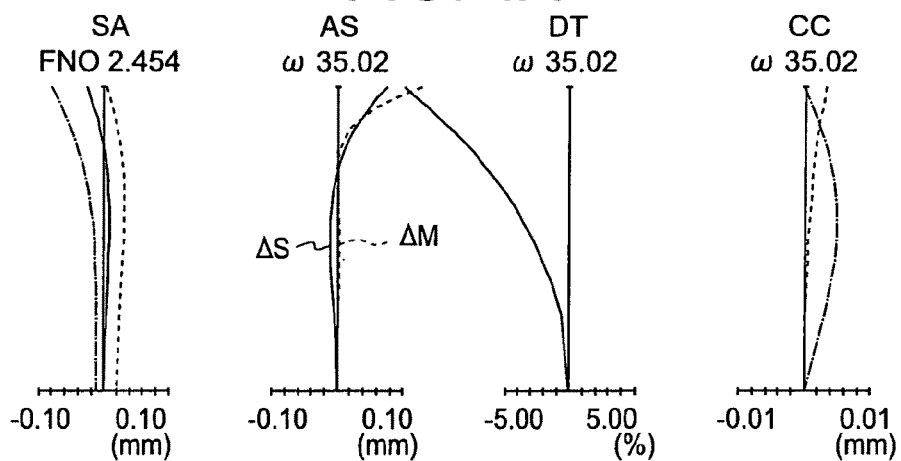
FIGS. 4A, 4B, and 4C are diagrams showing spherical aberration, astigmatism, distortion, and chromatic aberration of magnification when the zoom lens according to Example 2 achieves focus on the object point at infinity, where
Figure 4B:
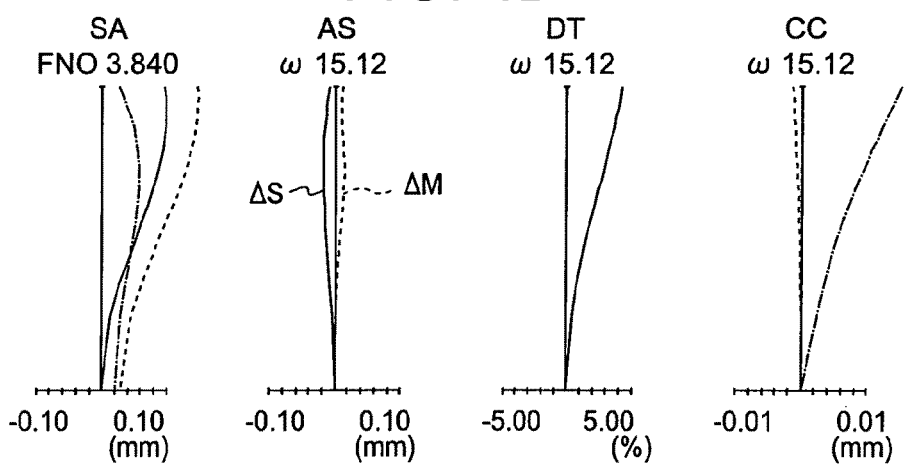
Figure 4C:
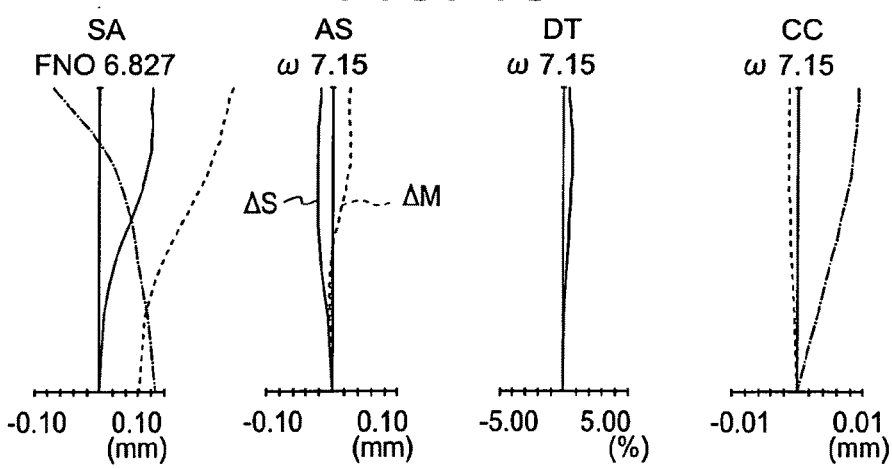

FIGS. 4A, 4B, and 4C are diagrams showing spherical aberration (SA), astigmatism (AS), distortion (DT), chromatic aberration of magnification (CC) when the zoom lens according to Example 2 achieves focus on the object point at infinity. FIG. 4A is a state at the wide-angle end, FIG. 4B is a state of intermediate focal length, and FIG. 4C is a state at the telephoto end.

As shown in FIGS. 3A, 3B, and 3C, the zoom lens of Example 2 includes, in order from the object side, a first lens group G1, an aperture stop S, a second lens group G2, and a third lens group G3.

The first lens group G1 comprises a cemented lens with a biconcave negative lens L1 and a positive meniscus lens L2 facing its convex surface toward the object side, having a negative refractive power as a whole.

The second lens group G2 comprises a biconvex positive lens L3 and a cemented lens with a negative meniscus lens L4 facing its convex surface toward the object side and a negative meniscus lens L5 facing its convex surface toward the object side, having a positive refractive power as a whole. The third lens group G3 comprises a positive meniscus lens L6 facing its convex surface toward the image plane side, having a positive refractive power as a whole.

Upon varying the degree of magnification from the wide-angle end to the telephoto end, the first lens group G1 moves toward the image plane side and turns around to move toward the object side, the second lens group G2 moves toward the object side, and the third lens group G3 moves toward the image plane side.

Aspheric surfaces are provided on six sides, namely: one side of the biconcave negative lens L1 facing toward the object side in the first lens group G1, one side of the positive meniscus lens L2 facing toward the image plane side, both sides of the biconvex positive lens L3 in the second lens group G2, one side of the negative meniscus lens L5 facing toward the image plane side, and one side of the positive meniscus lens L6 facing toward the image plane side in the third lens group G3.

Figure 5A:
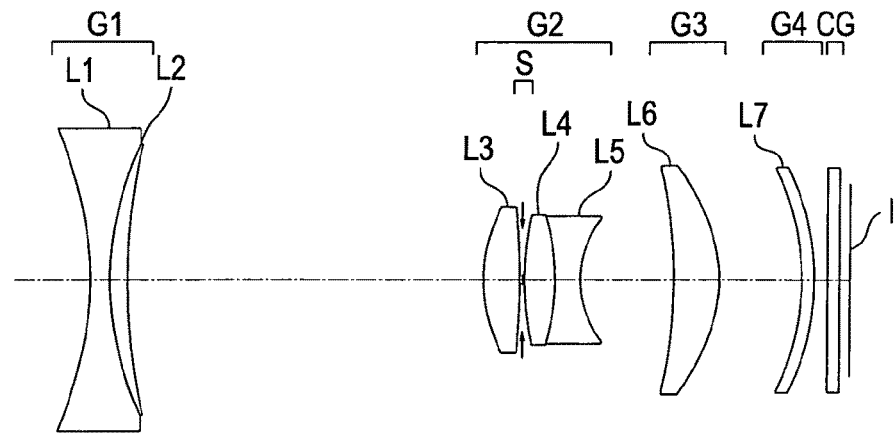
FIGS. 5A, 5B, and 5C are sectional views taken along the optical axis to show the optical structure of a zoom lens according to Example 3 of the present invention when focusing on an object point at infinity, where
Figure 5B:
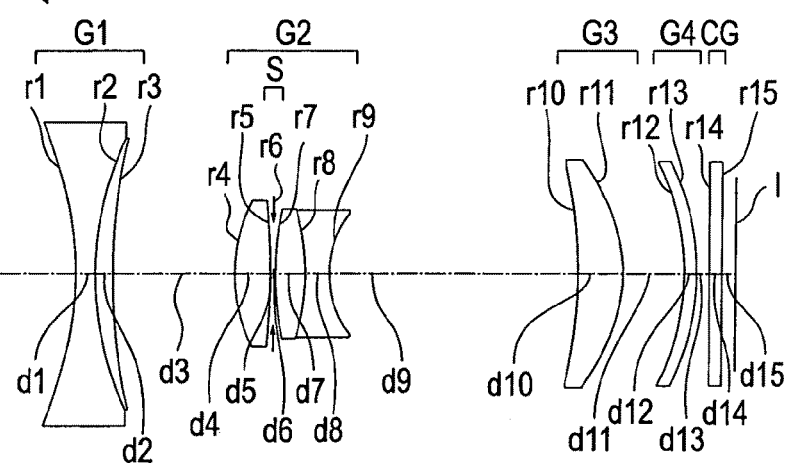
Figure 5C:
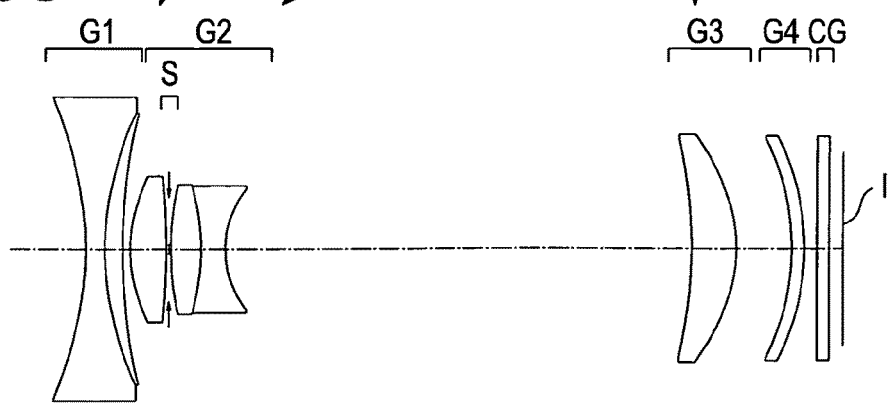

Next, a zoom lens according to Example 3 of the present invention will be described. FIGS. 5A, 5B, and 5C are sectional views taken along the optical axis to show the optical structure of the zoom lens according to Example 3 of the present invention when focusing on an object point at infinity. FIG. 5A is a state at the wide-angle end, FIG. 5B is a state of intermediate focal length, and FIG. 5C is a state at the telephoto end.

FIGS. 6A, 6B, and 6C are diagrams showing spherical aberration (SA), astigmatism (AS), distortion (DT), chromatic aberration of magnification (CC) when the zoom lens according to Example 3 achieves focus on the object point at infinity. FIG. 6A is a state at the wide-angle end, FIG. 6B is a state of intermediate focal length, and FIG. 6C is a state at the telephoto end.

As shown in FIGS. 5A, 5B, and 5C, the zoom lens of Example 3 includes, in order from the object side, a first lens group G1, a second lens group G2 having an aperture stop S, a third lens group G3, and a fourth lens group G4.

The first lens group G1 comprises a cemented lens with a biconcave negative lens L1 and a positive meniscus lens L2 facing its convex surface toward the object side, having a negative refractive power as a whole.

The second lens group G2 comprises a biconvex positive lens L3 and a cemented lens with a biconvex positive lens L4 and a biconcave negative lens L5, having a positive refractive power as a whole.

The third lens group G3 comprises a positive meniscus lens L6 facing its convex surface toward the image plane side, having a positive refractive power as a whole.

The fourth lens group G4 comprises a positive meniscus lens L7 facing its convex surface toward the image plane side, having a positive refractive power as a whole.

Upon varying the degree of magnification from the wide-angle end to the telephoto end, the first lens group G1 moves toward the image plane side and turns around to move toward the object side, the second lens group G2 moves toward the object side, the third lens group G3 moves toward the image plane side, and the fourth lens group G4 is fixed.

Aspheric surfaces are provided on six sides, namely: both sides of the biconcave negative lens L1 in the first lens group G1, one side of the positive meniscus lens L2 facing toward the image plane side, both sides of the biconvex positive lens L3 on the object side in the second lens group G2, and one side of the positive meniscus lens L6 facing toward the image plane side in the third lens group G3.

Figure 7A:
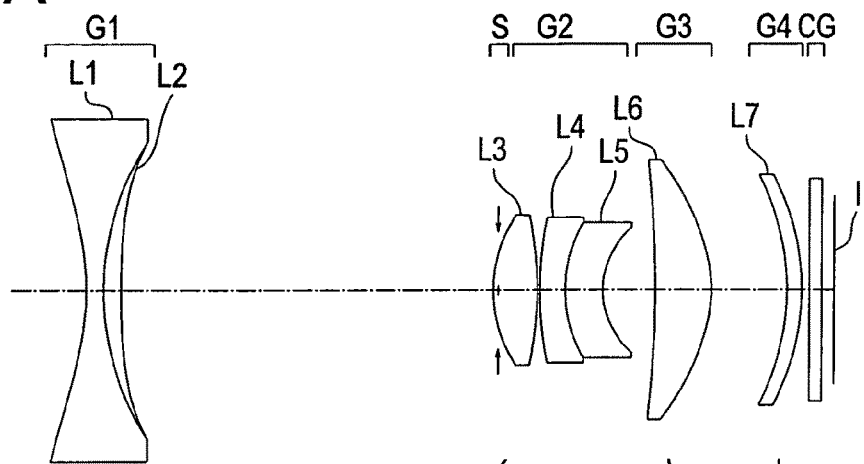
FIGS. 7A, 7B, and 7C are sectional views taken along the optical axis to show the optical structure of a zoom lens according to Example 4 of the present invention when focusing on an object point at infinity, where
Figure 7B:
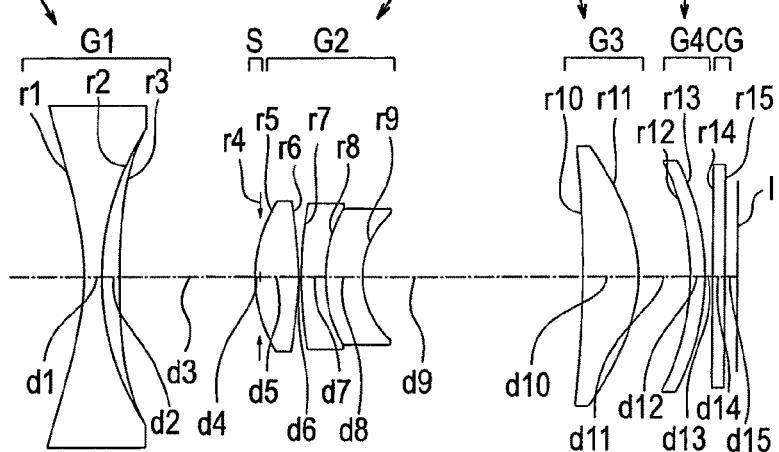
Figure 7C:
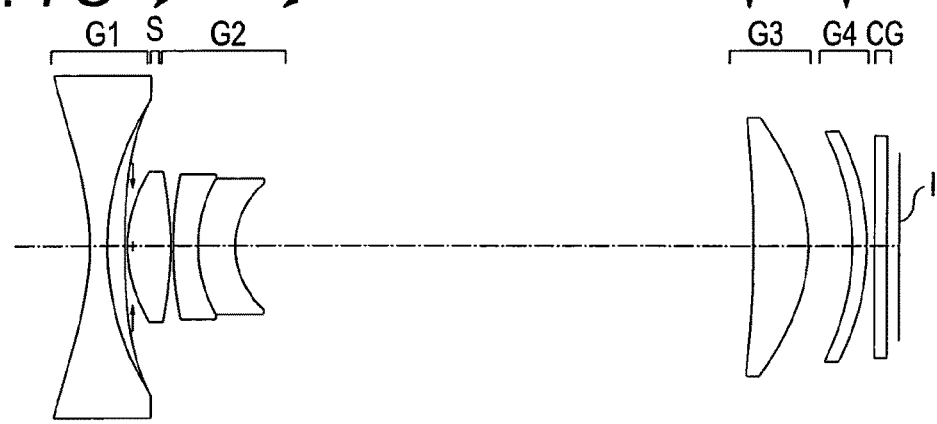

Next, a zoom lens according to Example 4 of the present invention will be described. FIGS. 7A, 7B, and 7C are sectional views taken along the optical axis to show the optical structure of the zoom lens according to Example 4 of the present invention when focusing on an object point at infinity. FIG. 7A is a state at the wide-angle end, FIG. 7B is a state of intermediate focal length, and FIG. 7C is a state at the telephoto end.

Figure 8A:
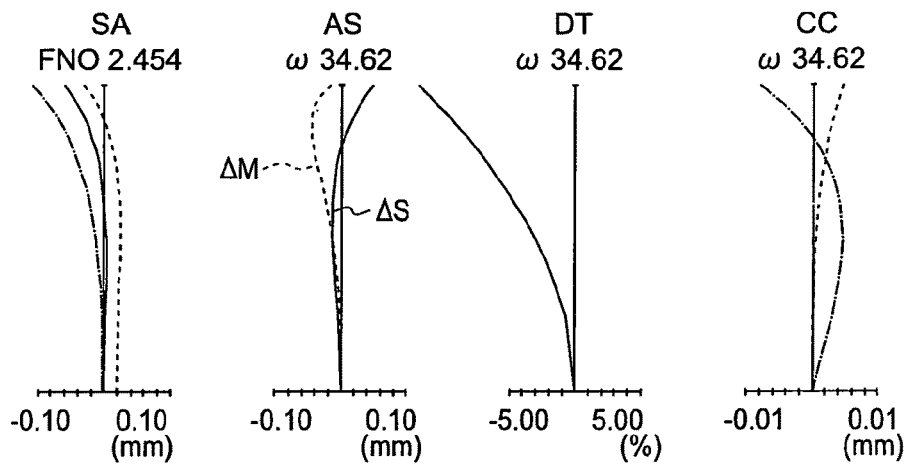
FIGS. 8A, 8B, and 8C are diagrams showing spherical aberration, astigmatism, distortion, and chromatic aberration of magnification when the zoom lens according to Example 4 achieves focus on the object point at infinity, where
Figure 8B:
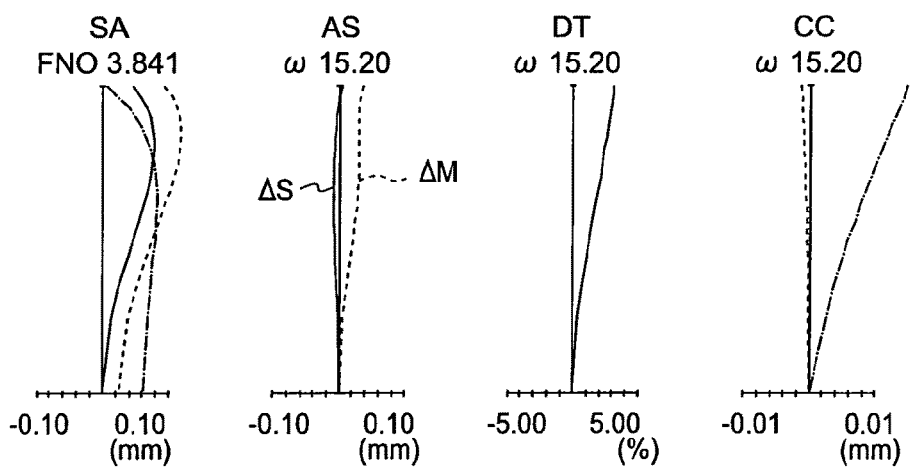
Figure 8C:
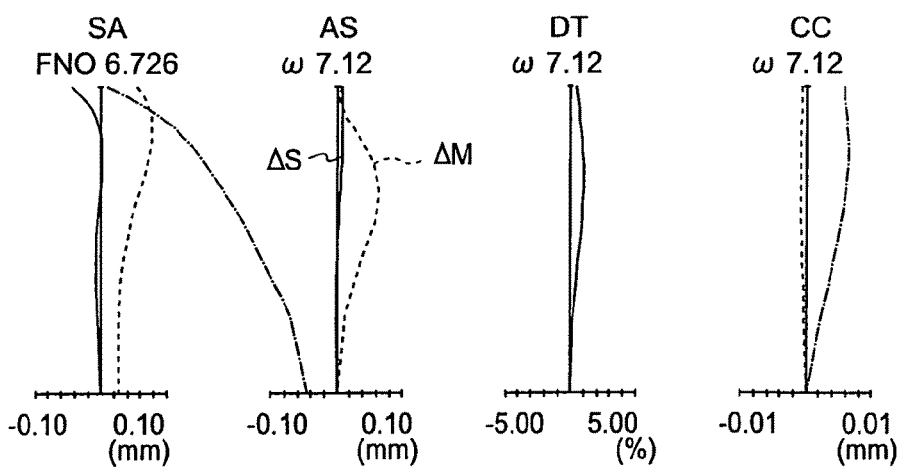

FIGS. 8A, 8B, 8C are diagrams showing spherical aberration (SA), astigmatism (AS), distortion (DT), chromatic aberration of magnification (CC) when the zoom lens according to Example 4 achieves focus on the object point at infinity. FIG. 8A is a state at the wide-angle end, FIG. 8B is a state of intermediate focal length, and FIG. 8C is a state at the telephoto end.

As shown in FIGS. 7A, 7B, and 7C, the zoom lens of Example 4 includes, in order from the object side, a first lens group G1, an aperture stop S, a second lens group G2, a third lens group G3, and a fourth lens group G4.

The first lens group G1 comprises a cemented lens with a biconcave negative lens L1 and a positive meniscus lens L2 facing its convex surface toward the object side, having a negative refractive power as a whole.

The second lens group G2 comprises a biconvex positive lens L3 and a cemented lens with a negative meniscus lens L4 facing its convex surface toward the object side and a negative meniscus lens L5 facing its convex surface toward the object side, having a positive refractive power as a whole.

The third lens group G3 comprises a positive meniscus lens L6 facing its convex surface toward the image plane side, having a positive refractive power as a whole.

The fourth lens group G4 comprises a positive meniscus lens L7 facing its convex surface toward the image plane side, having positive refractive power as a whole.

Upon varying the degree of magnification from the wide-angle end to the telephoto end, the first lens group G1 moves toward the image plane side and turns around to move toward the object side, the second lens group G2 moves toward the object side, the third lens group G3 moves toward the image plane side, and the fourth lens group G4 is fixed.

Aspheric surfaces are provided on six sides, namely: one side of the biconcave negative lens L1 facing toward the object side in the first lens group G1, one side of the positive meniscus lens L2 facing toward the image plane side, both sides of the biconvex positive lens L3 in the second lens group G2, one side of the negative meniscus lens L5 facing toward the image plane side, and one side of the positive meniscus lens L6 facing toward the image plane side in the third lens group G3.

Numerical data of each embodiment described above is shown below. Apart from symbols described above, each of r1, r2, ... denotes radius of curvature of each lens surface, each of d1, d2, ... denotes a distance between two lenses, each of nd1, nd2, ... denotes a refractive index of each lens for a d-line, and each of vd1, vd2, ... denotes an Abbe constant for each lens. Further, $F_{NO}$ denotes an F number, f denotes a focal length of the entire zoom lens system, * denotes an aspheric data, BF denotes a back focus.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'. Symbols in the numerals data are common in the numerical data of each of examples.

Example 1

| Unit mm | | | | |
|---|---|---|---|---|
| Surface data | | | | |
| Surface no. | r | d | nd | vd |
| Object plane | ∞ | ∞ | | |
| 1* | −13.332 | 0.80 | 1.52542 | 55.78 |
| 2* | 12.259 | 0.63 | 1.63494 | 23.22 |
| 3* | 23.856 | Variable | | |
| 4* | 6.080 | 1.46 | 1.74320 | 49.34 |
| 5* | −26.523 | 0.10 | | |
| 6(Stop) | ∞ | 0.10 | | |
| 7 | 12.200 | 1.23 | 1.80610 | 40.92 |
| 8 | −8.871 | 1.03 | 1.72151 | 29.23 |
| 9 | 3.944 | Variable | | |
| 10 | −20.000 | 1.78 | 1.52542 | 55.78 |
| 11* | −5.926 | Variable | | |
| 12 | ∞ | 0.50 | 1.52542 | 55.78 |
| 13 | ∞ | 0.50 | | |
| 14 | ∞ | 0.50 | 1.51633 | 64.14 |
| 15 | ∞ | 0.37 | | |
| Image plane(Light receiving surface) ∞ | | | | |

Aspherical surface data

1st surface

K = −0.145
A4 = 7.25318e−05, A6 = −1.19008e−06, A8 = 2.62337e−08

2nd surface

K = 0.000
A4 = 1.64212e−05, A6 = −1.18005e−05, A8 = 1.22010e−08

3rd surface

K = −0.228
A4 = −4.45014e−05, A6 = −4.06624e−06, A8 = 7.00304e−08,
A10 = 5.46740e−11

4th surface

K = −0.097
A4 = −4.58138e−04, A6 = −3.07424e−05, A8 = 2.28084e−06,
A10 = −5.62682e−08

5th surface

K = −3.283
A4 = 4.32944e−04, A6 = −3.85171e−05, A8 = 4.06296e−06,
A10 = −1.40317e−07

11th surface

K = −0.852
A4 = 1.04307e−03, A6 = −4.91126e−05, A8 = 1.52891e−06,
A10 = −2.22105e−08

-continued

Unit mm

Zoom data

|  | Wide angle | Intermediate2 | Telephoto |
|---|---|---|---|
| Focal length | 6.47 | 13.34 | 24.86 |
| Fno. | 2.74 | 4.04 | 6.14 |
| Angle of field2ω | 71.45 | 31.28 | 17.19 |
| BF(in air) | 4.62 | 4.01 | 3.65 |
| Lens total length(in air) | 29.53 | 25.45 | 29.25 |
| d3 | 14.08 | 4.70 | 0.30 |
| d9 | 3.70 | 9.61 | 18.18 |
| d11 | 3.09 | 2.35 | 2.00 |

|  | Intermediate1 | Intermediate3 |
|---|---|---|
| Focal length | 9.91 | 19.62 |
| Fno. | 3.39 | 5.21 |
| Angle of field2ω | 42.47 | 21.56 |
| BF(in air) | 4.31 | 3.64 |
| Lens total length(in air) | 25.95 | 26.94 |
| d3 | 7.77 | 1.76 |
| d9 | 6.74 | 14.41 |
| d11 | 2.66 | 2.00 |

Unit focal length

| f1 = −17.31 | f2 = 9.85 | f3 = 15.36 |
|---|---|---|

Example 2

Unit mm

Surface data

| Surface no. | r | d | nd | vd |
|---|---|---|---|---|
| Object plane | ∞ | ∞ | | |
| 1* | −10.946 | 0.70 | 1.52542 | 55.78 |
| 2 | 10.738 | 0.76 | 1.63494 | 23.22 |
| 3* | 40.183 | Variable | | |
| 4(Stop) | ∞ | −0.20 | | |
| 5* | 5.417 | 1.57 | 1.74320 | 49.34 |
| 6* | −11.069 | 0.10 | | |
| 7 | 15.682 | 1.00 | 1.92286 | 18.90 |
| 8 | 5.695 | 1.53 | 1.69350 | 53.21 |
| 9* | 3.162 | Variable | | |
| 10 | −61.542 | 2.49 | 1.52542 | 55.78 |
| 11* | −6.128 | Variable | | |
| 12 | ∞ | 0.60 | 1.52542 | 55.78 |
| 13 | ∞ | 0.30 | | |
| 14 | ∞ | 0.50 | 1.51633 | 64.14 |
| 15 | ∞ | 0.50 | | |
| 16 | ∞ | −0.01 | | |
| Image plane(Light receiving surface) | ∞ | | | |

Aspherical surface data

1st surface

K = −5.139
A4 = 1.16427e−04, A6 = −1.28940e−06
3rd surface

K = 0.000
A4 = 3.36449e−04, A6 = −1.77161e−06
5th surface

K = −1.510
A4 = 5.19673e−04, A6 = 3.42006e−05, A8 = −3.21256e−06

-continued

Unit mm

6th surface

K = 0.000
A4 = 2.23013e−03, A6 = −9.84966e−05, A8 = 1.17518e−06
9th surface

K = −0.745
A4 = −1.35331e−03, A6 = 3.34481e−04, A8 = 2.58848e−06
11th surface

K = −0.745
A4 = 1.15198e−03, A6 = −2.92821e−05, A8 = 3.79516e−07

Zoom data

|  | Wide angle | Intermediate2 | Telephoto |
|---|---|---|---|
| Focal length | 6.27 | 13.60 | 30.40 |
| Fno. | 2.45 | 3.84 | 6.83 |
| Angle of field2ω | 70.03 | 30.24 | 14.30 |
| BF(in air) | 4.45 | 3.51 | 2.51 |
| Lens total length(in air) | 29.48 | 25.74 | 31.45 |
| d3 | 14.91 | 5.36 | 0.30 |
| d9 | 2.16 | 8.92 | 20.68 |
| d11 | 2.94 | 2.00 | 0.99 |

|  | Intermediate1 | Intermediate3 |
|---|---|---|
| Focal length | 8.96 | 20.02 |
| Fno. | 2.97 | 5.00 |
| Angle of field2ω | 46.12 | 21.00 |
| BF(in air) | 4.08 | 3.00 |
| Lens total length(in air) | 26.51 | 27.20 |
| d3 | 9.63 | 2.51 |
| d9 | 4.85 | 13.73 |
| d11 | 2.57 | 1.49 |

Unit focal length

| f1 = −18.52 | f2 = 9.96 | f3 = 12.75 |
|---|---|---|

Example 3

Unit mm

Surface data

| Surface no. | r | d | nd | vd |
|---|---|---|---|---|
| Object plane | ∞ | ∞ | | |
| 1* | −12.787 | 0.76 | 1.52542 | 55.78 |
| 2* | 11.152 | 0.70 | 1.63494 | 23.22 |
| 3* | 24.628 | Variable | | |
| 4* | 6.036 | 1.42 | 1.74320 | 49.34 |
| 5* | −26.893 | 0.11 | | |
| 6(Stop) | ∞ | 0.08 | | |
| 7 | 12.034 | 1.20 | 1.80610 | 40.92 |
| 8 | −9.091 | 0.97 | 1.72151 | 29.23 |
| 9 | 3.932 | Variable | | |
| 10 | −20.000 | 1.76 | 1.52542 | 55.78 |
| 11* | −5.895 | Variable | | |
| 12 | −10.000 | 0.50 | 1.52542 | 55.78 |
| 13 | −10.000 | 0.50 | | |
| 14 | ∞ | 0.50 | 1.51633 | 64.14 |
| 15 | ∞ | 0.40 | | |
| Image plane(Light receiving surface) | ∞ | | | |

-continued

Unit mm

Aspherical surface data

1st surface

K = −0.317
A4 = 1.25939e−04, A6 = 3.70230e−07, A8 = 4.19316e−09
2nd surface

K = 0.000
A4 = −4.19678e−04, A6 = 5.79213e−06, A8 = 4.62633e−08
3rd surface

K = 0.701
A4 = −6.89254e−05, A6 = 2.00496e−06, A8 = 4.12169e−08,
A10 = 5.46740e−11
4th surface K = −0.088
A4 = −4.90879e−04, A6 = −2.10004e−05, A8 = 6.51579e−07,
A10 = 3.12615e−09
5th surface K = −3.208
A4 = 4.04069e−04, A6 = −3.29391e−05, A8 = 2.90967e−06,
A10 = −8.99780e−08
11th surface K = −0.831
A4 = 7.96270e−04, A6 = −2.33898e−05, A8 = 4.28033e−07,
A10 = −3.24976e−09

Zoom data

|  | Wide angle | Intermediate2 | Telephoto |
| --- | --- | --- | --- |
| Focal length | 6.54 | 13.47 | 25.10 |
| Fno. | 2.74 | 4.06 | 6.14 |
| Angle of field2ω | 70.56 | 31.21 | 17.07 |
| BF(in air) | 1.23 | 1.36 | 1.36 |
| Lens total length(in air) | 29.78 | 25.90 | 29.81 |
| d3 | 14.10 | 4.80 | 0.30 |
| d9 | 3.70 | 9.81 | 18.46 |
| d11 | 3.26 | 2.42 | 2.19 |

|  | Intermediate1 | Intermediate3 |
| --- | --- | --- |
| Focal length | 10.06 | 19.93 |
| Fno. | 3.42 | 5.24 |
| Angle of field2ω | 42.15 | 21.31 |
| BF(in air) | 1.36 | 1.36 |
| Lens total length(in air) | 26.40 | 27.46 |
| d3 | 7.85 | 1.74 |
| d9 | 6.99 | 14.72 |
| d11 | 2.69 | 2.14 |

Unit focal length

| f1 = −17.32 | f2 = 9.96 | f3 = 15.26 | f4 = 1105.11 |
| --- | --- | --- | --- |

Example 4

Unit mm

Surface data

| Surface no. | r | d | nd | νd |
| --- | --- | --- | --- | --- |
| Object plane | ∞ | ∞ | | |
| 1* | −10.845 | 0.70 | 1.52542 | 55.78 |
| 2 | 11.220 | 0.71 | 1.63494 | 23.22 |
| 3* | 40.344 | Variable | | |
| 4(Stop) | ∞ | −0.20 | | |
| 5* | 5.421 | 1.76 | 1.74320 | 49.34 |
| 6* | −10.915 | 0.10 | | |
| 7 | 15.570 | 1.00 | 1.92286 | 18.90 |
| 8 | 5.537 | 1.50 | 1.69350 | 53.21 |
| 9* | 3.145 | Variable | | |
| 10 | −48.975 | 2.21 | 1.52542 | 55.78 |
| 11* | −6.107 | Variable | | |
| 12 | −10.000 | 0.60 | 1.52542 | 55.78 |
| 13 | −10.000 | 0.30 | | |
| 14 | ∞ | 0.50 | 1.51633 | 64.14 |
| 15 | ∞ | 0.50 | | |
| 16 | ∞ | 0.00 | | |
| Image plane(Light receiving surface) | ∞ | | | |

Aspherical surface data

1st surface

K = −2.647
A4 = 2.97954e−04, A6 = −1.71520e−06
3rd surface

K = 0.000
A4 = 2.90137e−04, A6 = 1.96918e−06
5th surface

K = −1.432
A4 = 4.58888e−04, A6 = 3.52860e−05, A8 = −2.75236e−06
6th surface

K = 0.000
A4 = 2.27579e−03, A6 = −9.27755e−05, A8 = 7.10848e−07
9th surface

K = −0.700
A4 = −1.46636e−03, A6 = 2.65673e−04, A8 = 2.19727e−05
11th surface

K = −0.640
A4 = 1.08288e−03, A6 = −2.89123e−05, A8 = 4.34085e−07

Zoom data

|  | Wide angle | Intermediate2 | Telephoto |
| --- | --- | --- | --- |
| Focal length | 6.30 | 13.67 | 30.56 |
| Fno. | 2.45 | 3.84 | 6.73 |
| Angle of field2ω | 69.24 | 30.40 | 14.23 |
| BF(in air) | 1.13 | 1.13 | 1.12 |
| Lens total length(in air) | 29.87 | 26.13 | 32.47 |
| d3 | 15.21 | 5.66 | 0.30 |
| d9 | 2.08 | 8.83 | 20.87 |
| d11 | 3.08 | 2.13 | 1.80 |

|  | Intermediate1 | Intermediate3 |
| --- | --- | --- |
| Focal length | 9.13 | 20.41 |
| Fno. | 2.99 | 5.02 |
| Angle of field2ω | 45.59 | 20.75 |
| BF(in air) | 1.13 | 1.13 |
| Lens total length(in air) | 26.76 | 27.69 |
| d3 | 9.69 | 2.57 |
| d9 | 4.83 | 13.78 |
| d11 | 2.73 | 1.84 |

Unit focal length

| f1 = −18.24 | f2 = 9.92 | f3 = 13.05 | f4 = 920.93 |
| --- | --- | --- | --- |

Here, values of each of examples are shown below:

|  | Example1 | Example2 | Example3 | Example4 | Note |
|---|---|---|---|---|---|
| (1)(G1(W) − G1(H))/fw (reference value at wide-angle end) | 0.2509 | 0.2973 | 0.2102 | 0.2865 | Maximum value |
|  | 0.0428 | −0.3132 | −0.0030 | −0.4118 |  |
| (2)φR_G1(Y)/φR_G1 | — | 1.4637 | — | 1.4751 | Minimum value |
|  | — | 1.6838 | — | 1.7684 | Maximum value |
| (3){φL_G1(Y) + φR_G1(Y)} × fw | −0.4275 | — | −0.4372 | — | Minimum value |
|  | −0.3685 | — | −0.4085 | — | Maximum value |
| (4)(R_G2L + R_G2R)/(R_G2L − R_G2R) | −0.6270 | −0.3428 | −0.6334 | −0.3363 |  |
| (5)D_G2N/D_G2 | 0.3734 | 0.3735 | 0.3764 | 0.4033 |  |
| (6) {ASP_G3R(Y) − SPH_G3R(Y)}/fw | 0.0525 | 0.1024 | 0.0504 | 0.1040 |  |
| (7)D_G3 − I/FIM | 1.2935 | 1.2607 | 1.3436 | 1.3003 |  |
| (8)ΔW_2 − 3/ΔT_3 − I | 0.9271 | 0.7505 | 0.8763 | 0.5639 |  |
| (9)|1/vLB − 1/vLA| | 0.0251 | 0.0251 | 0.0251 | 0.0251 |  |
| (10)|1/nLB − 1/nLA| | 0.0439 | 0.0439 | 0.0439 | 0.0439 |  |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 10:
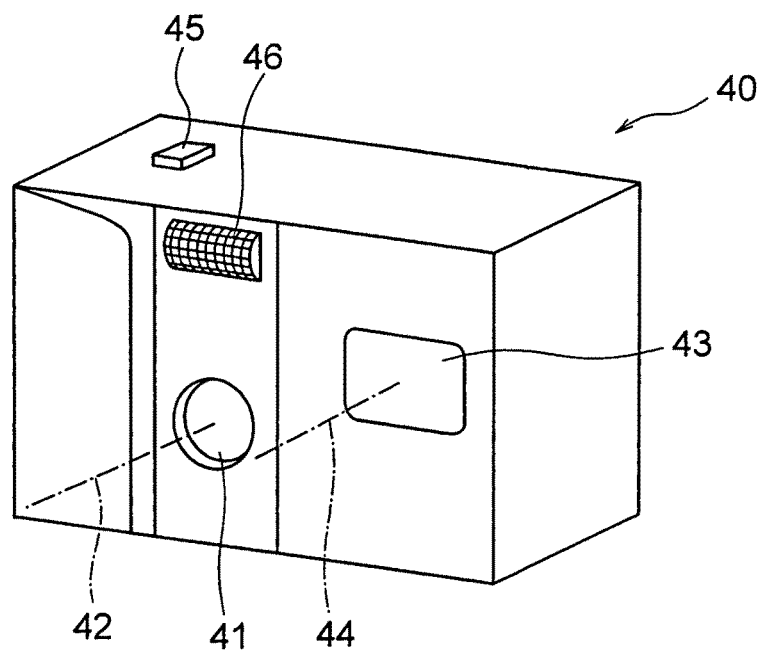
FIG. 10 is a front perspective view showing the appearance of a digital camera 40 in which a zoom optical system according to the present invention is incorporated.
Figure 11:
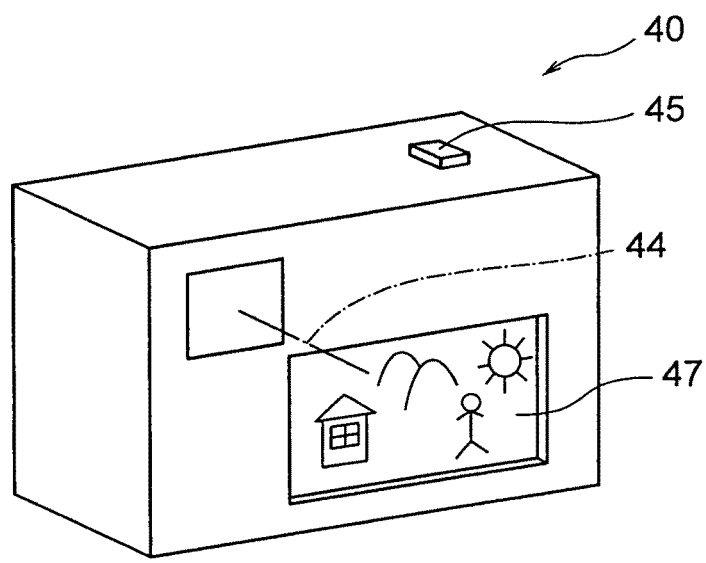
FIG. 11 is a rear perspective view of the digital camera 40.

In FIG. 9 to FIG. 11 show conceptual diagrams of structures in which the image forming optical system according to the present invention is incorporated in a photographic optical system 41 of a digital camera. FIG. 9 is a frontward perspective view showing an appearance of a digital camera 40, FIG. 10 is a rearward perspective view of the same, and FIG. 11 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Further, the present invention could be applied to the above-mentioned collapsible type digital camera as well as a bending type (an optical path reflecting type) digital camera having a bending optical system (optical path reflecting lens).

Figure 12:
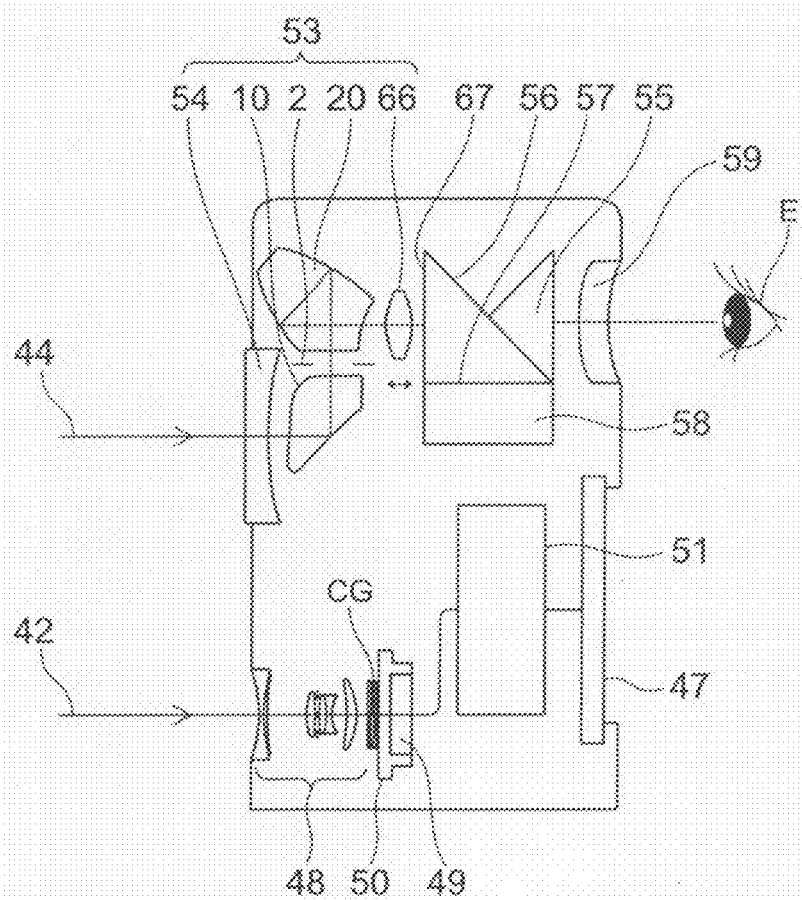
FIG. 12 is a sectional view showing the optical structure of the digital camera 40.
Figure 13:
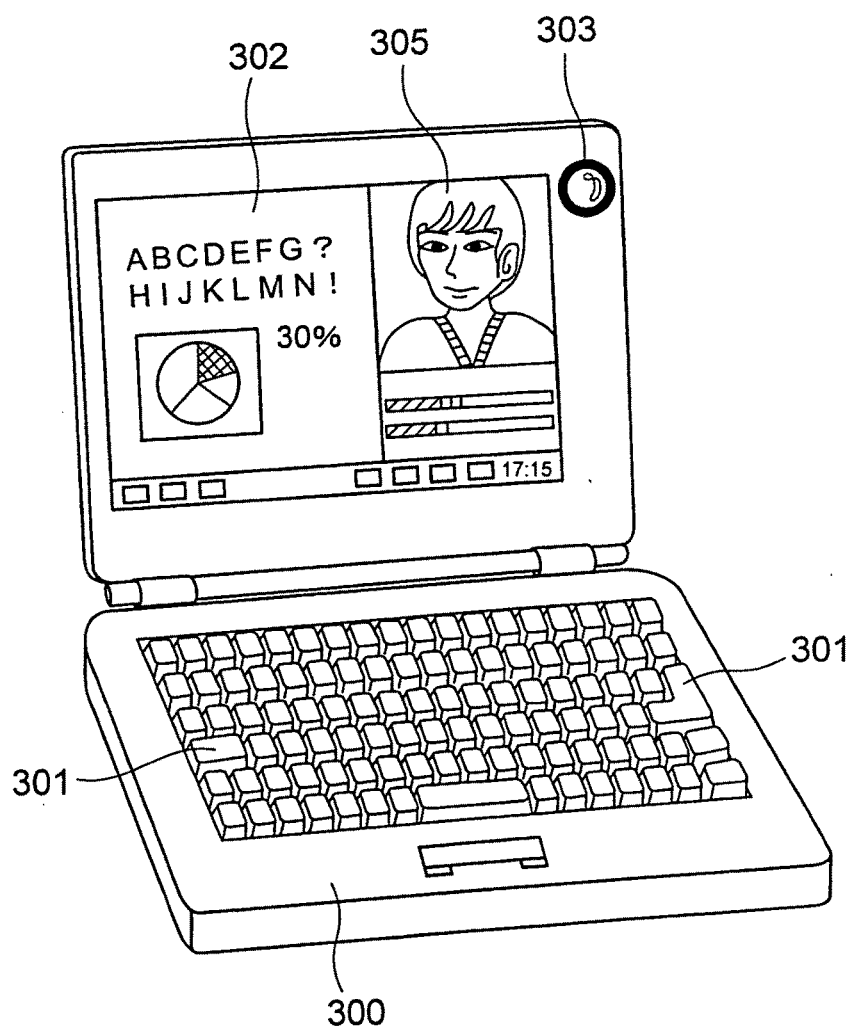
FIG. 13 is a front perspective view of a personal computer 300 with its cover open as an example of an information processing apparatus in which the zoom optical system of the present invention is incorporated as an objective optical system.
Figure 14:
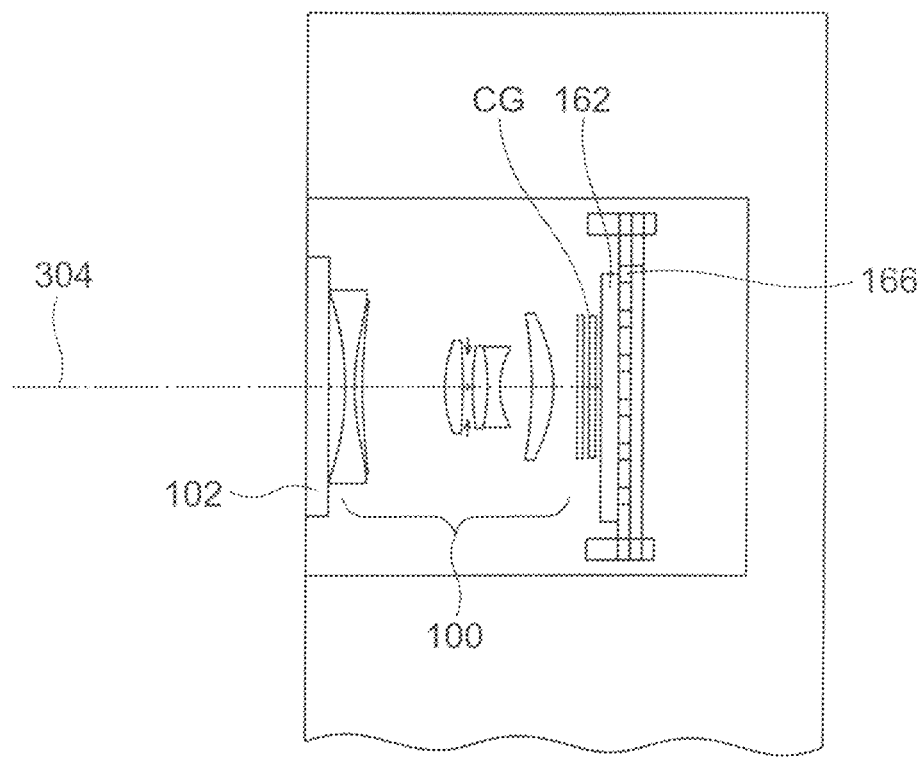
FIG. 14 is a sectional view of a photographing optical system 303 of the personal computer 300.
Figure 15:
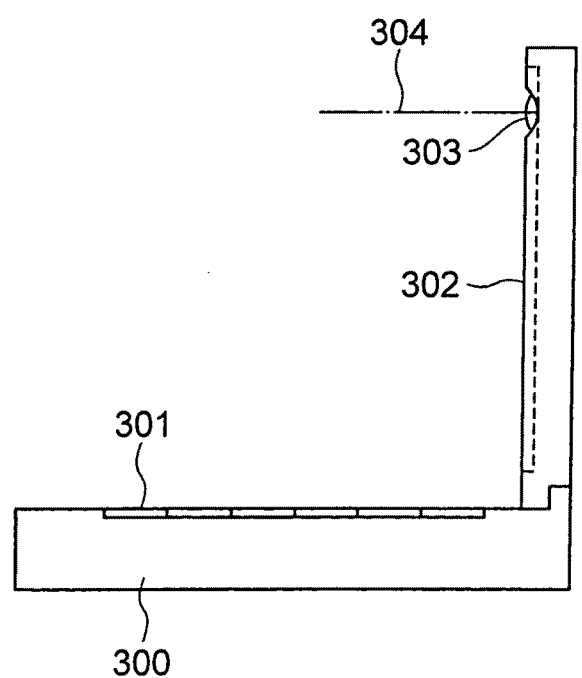
FIG. 15 is a side view of the personal computer 300.

Next, a personal computer which is an example of an information processing apparatus with a built-in image forming system as an objective optical system is shown in FIG. 12 to FIG. 14. FIG. 12 is a frontward perspective view of a personal computer 300 with its cover opened, FIG. 13 is a cross-sectional view of a photographic optical system 303 of the personal computer 300, and FIG. 14 is a side view of FIG. 14. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Next, a telephone which is an example of an information processing apparatus in which the image forming optical system of the present invention is built-in as a photographic optical system, particularly a portable telephone which is easy to carry is shown in FIG. 15A, FIG. 15B, and FIG. 15C. FIG. 15A is a front view of a portable telephone 400, FIG. 15B is a side view of the portable telephone 400, and FIG. 15C is a cross-sectional view of a photographic optical system 405. As shown in FIG. 15A to FIG. 15C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

Although it is generally difficult to reduce the aberrations both of wide-angle end and telephoto end, according to the present invention, occurrence of various aberrations could be reduced. The optical system having a short entire length at wide-angle end and telephoto end could be provided.

Further, the image forming optical system having good optical performance for an optical system of the digital camera consisting of a least number of lenses (7 or less) of which entire length at a shooting is short, and has a zoom ration of 3.4 times or more (nominal 4).

As described above, the image forming optical system according to the present invention particularly has excellent optical performance and is suitable for a compact digital camera.

According to the present invention, the optical system can be made more compact and thinner, and an image forming optical system in which various aberrations, mainly chromatic aberrations, are corrected properly can be obtained. Use of such an image forming optical system in an electronic image pickup apparatus can prevent images from being subjected to sharpening and chromatic blurring.

What is claimed is:

1. An image forming optical system comprising three groups having, in order from an object side to an image side, a first lens group having a negative refractive power, a second lens group having a positive refractive power, and a third lens group having a positive refractive power, or four groups with one more lens group added to the image side, the first lens group comprises one lens component facing its concave surface toward the object side, the second lens group comprises a single lens having a positive refractive power and a cemented lens having a negative refractive power as a whole, and the third lens group comprises a lens component having a positive refractive power, wherein upon zooming from a wide-angle end toward a telephoto side, the amount of movement of the first lens group along an optical axis direction in an area, where a focal length of the entire image pickup optical system is 3.4 times or more with respect to at the wide-angle end, satisfies the following conditional expression (1):

$$-1 \leq (G1(W) - G1(H))/fw \leq 0.5 \quad (1)$$

where

G1(W) is distance from an image plane to a surface of the first lens group on the most image plane side at the wide-angle end of the image forming optical system, and G1(H) is distance from the image plane to the surface of the first lens group on the most image plane side in the area, where the focal length of the image forming optical system is 3.4 times or more with respect to at the wide-angle end.

2. The image forming optical system according to claim 1, wherein the first lens group comprises a cemented lens consisting of a lens An having a negative refractive power and a lens Ap having a positive refractive power, the cementing surface is a spherical surface, the image side surface of the first lens group is an aspheric surface, and the following conditional expression (2) is satisfied:

$$1 \leq \phi R\_G1(Y)/\phi R\_G1 \leq 2 \quad (2)$$

where $\phi R\_G1(Y)$ is refractive power of a surface of the first lens group on the most image plane side at distance Y from the optical axis, φR_G1 is refractive power of a surface of the first lens group on the most image plane side, and a range of Y is an image height on the image plane to show the following relation:

$$\text{image height} \times 0.8 \leq Y \leq \text{image height at image plane}.$$

3. The image forming optical system according to claim 1, wherein in the cemented lens consisting of the lens An having a negative refractive power and the lens Ap having a positive refractive power in the first lens group, the cementing surface is an aspheric surface, a surface of the first lens group on the most image plane side is an aspheric surface, and the following conditional expression (3) is satisfied:

$$-1 \leq \{\phi L\_G1(Y) + \phi R\_G1(Y)\} \times fw \leq 0 \quad (3)$$

where

φL_G1(Y) is refractive power of a surface of the first lens group on the most object side when a height of a beam of light is Y, φR_G1(Y) is refractive power of a surface of the first lens group on the most image plane side when the height of the beam of light is Y, and fw is focal length of the entire image forming optical system at the wide-angle end.

4. The image forming optical system according to claim 1, wherein in regard to the lens component having a positive refractive power located on the most object side in the second lens group, the conditional expression (4) is satisfied:

$$-1 \leq (R\_G2L + R\_G2R)/(R\_G2L - R\_G2R) \leq -0.1 \quad (4)$$

where

R_G2L is a curvatures radius of an object side surface of the lens component having a positive refractive power, and R_G2R is a radius of curvature of an image side surface of the lens component having a positive refractive power.

5. The image forming optical system according to claim 1, wherein in the second lens group, the conditional expression (5) is satisfied:

$$0.14 \leq D\_G2N/D\_G2 \leq 0.5 \quad (5)$$

where

D_G2 is a total central thickness of the second lens group, and

D_G2N is a central thickness of the lens component having a negative refractive power on the most image side in the cemented lens having a negative refractive power of the second lens group.

6. The image forming optical system according to claim 1, wherein the third lens group is a focusing lens and satisfies the following conditional expression (6):

$$0.05 \leq \{ASP\_G3R(Y) - SPH\_G3R(Y)\}/fw \leq 0.5 \quad (6)$$

where in regard to a shape of the most image side surface in the third lens group, SPH_G3R(Y) is a paraxial radius of curvature, ASP_G3R(Y) is the aspheric surface shape, and FIM is an image height, and the aspheric surface shape is further defined by the following expression:

$$ASP(Y) = \frac{\frac{1}{R}Y^2}{1 + \sqrt{1 - (1+k)\left(\frac{Y}{R}\right)^2}} + BY^4 + CY^6 + DY^8 + EY^{10} + \ldots$$

Y is a height from the optical axis,

R is a paraxial radius of curvature, k is a conical coefficient, and

B, C, D, and E are constants.

7. The image forming optical system according to claim 1, wherein the third lens group is a focusing lens and satisfies the following conditional expression (7):

$$3 \leq D\_G3\text{-}I/FIM \leq 5 \quad (7)$$

where

D_G3-I is distance from the most image side surface of the third lens group to the image plane at the wide-angle end, and FIM is an image height on the image plane.

8. The image forming optical system according to claim 1, wherein the following conditional expression (8) is satisfied:

$$0.5 \leq \Delta W\_2\text{-}3/\Delta T\_3\text{-}I \leq 1 \quad (8)$$

ΔW_2-3 is distance from the image side surface of the second lens group to the object side surface of the third lens group at the wide-angle end, and ΔT_3-I is distance from the image side surface of the third lens group to the image plane at the telephoto end.

9. The image forming optical system according to claim 1, wherein the first lens group is composed by cementing two lenses, and when a lens whose paraxial focal length is a positive value is set as a positive lens, the positive lens in the first lens group is expressed as LA, and when a lens whose paraxial focal length is a negative value is set as a negative lens, a lens LB with which the lens LA is cemented is the negative lens, and the following conditional expression (9) is satisfied:

$$0.01 \leq |1/\nu LB - 1/\nu LA| \leq 0.06 \quad (9)$$

where

νLB is Abbe constant $(nd_A - 1)/(nF_A - nC_A)$ of the positive lens LA,

νLA is Abbe constant $(nd_B - 1)/(nF_B - nC_B)$ of the negative lens LB, $nd_A$, $nC_A$, and $nF_A$ are refractive indexes of the refractive optical element LA for d-line, C-line, and F-line, respectively, and $nd_B$, $nC_B$, and $nF_B$ are refractive indexes of the refractive optical element LB for d-line, C-line, and F-line, respectively.

10. The image forming optical system according to claim 1, wherein the conditional expression (10) is satisfied:

$$0 \leq |1/nLB - 1/nLA| \leq 0.55 \quad (10)$$

nLA is the refractive index of a material of the lens LA for d-line, and nLB is the refractive index of a material of the lens LB for d-line.

11. An electronic image pickup apparatus comprising: the image forming optical system according to claim 1; an electronic image pickup device; and image processing means for processing image data obtained by picking up, on the electronic image pickup device, an image formed through the image forming optical system and outputting it as image data with an image shape changed, wherein the image forming optical system is a zoom lens, and the image forming optical system satisfies the following conditional expression when focusing on an object located at infinity:

$$0.700 < y07/(fw \times \tan \omega 07w) < 0.975 \qquad (B)$$

where y07 is expressed as $y07 = 0.7 \times y10$ when distance (maximum image height) from the center to the farthest point within an effective image pickup plane (within a plane capable of picking up the image) of the electronic image pickup device is expressed as y10, and $\omega 07w$ is an angle with respect to the optical axis in the direction of the object point corresponding to an image point formed at position y07 from the center on the image pickup plane at the wide-angle end, and fw is a focal length of the entire image forming optical system at the wide-angle end.

* * * * *